(12) United States Patent
Huang et al.

(10) Patent No.: US 11,751,284 B2
(45) Date of Patent: Sep. 5, 2023

(54) COOPERATIVE RELAY IN SIDELINK NETWORKS

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Tugcan Aktas, La Jolla, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/304,796

(22) Filed: Jun. 25, 2021

(65) Prior Publication Data

US 2022/0095417 A1 Mar. 24, 2022

Related U.S. Application Data

(60) Provisional application No. 63/083,047, filed on Sep. 24, 2020.

(51) Int. Cl.
*H04W 88/04* (2009.01)
*H04W 56/00* (2009.01)
(Continued)

(52) U.S. Cl.
CPC ............ *H04W 88/04* (2013.01); *H04W 4/06* (2013.01); *H04W 56/001* (2013.01); *H04W 72/121* (2013.01); *H04W 72/20* (2023.01)

(58) Field of Classification Search
CPC ..... H04W 88/04; H04W 4/06; H04W 56/001; H04W 72/0406; H04W 72/121;
(Continued)

(56) References Cited

U.S. PATENT DOCUMENTS

| 5,623,493 A * | 4/1997 | Kagemoto ............ H04L 49/206 370/535 |
| 2007/0217432 A1* | 9/2007 | Molisch ................ H04W 52/46 370/400 |

(Continued)

FOREIGN PATENT DOCUMENTS

EP 3399835 A1 11/2018

OTHER PUBLICATIONS

China Potevio Co et al: "Performance study of relay cooperative way in LTE-advanced system", 3GPP Draft; R1-090671 Performance Study of Relay Cooperative Way in LTE-A System, 3rd Generation Partnership Project (3GPP), Mobile Competence Centre; 650, Route Des Lucioles; F-06921 Sophia-Antipolis Cedex ; France, vol. RAN WG1, No. Athens; Feb. 9, 2009-Feb. 13, 2009, Feb. 3, 2009 (Feb. 3, 2009), XP050597234, [retrieved on Feb. 3, 2009].
International Search Report and Written Opinion—PCT/US2021/049268—ISA/EPO—dated Nov. 19, 2021.

*Primary Examiner* — Afshawn M Towfighi
(74) *Attorney, Agent, or Firm* — QUALCOMM Incorporated

(57) ABSTRACT

Apparatus, methods, and computer-readable media for cooperative relay in sidelink networks are disclosed herein. An example method for wireless communication at a first user equipment (UE) includes receiving, from a second UE, a groupcast signal comprising a resource allocation assigned to a plurality of sidelink UEs including the first UE. The example method also includes communicating, with a remote apparatus on a first resource included in the resource
(Continued)

allocation, a first relay signal comprising at least a portion of the groupcast signal, in which the first relay signal corresponds to at least a portion of a second relay signal communicated with the remote apparatus on a second resource included in the resource allocation by at least one other sidelink UE of the plurality of sidelink UEs.

30 Claims, 13 Drawing Sheets

(51) Int. Cl.
*H04W 4/06* (2009.01)
*H04W 72/121* (2023.01)
*H04W 72/20* (2023.01)

(58) Field of Classification Search
CPC ....... H04W 4/08; H04W 76/40; H04W 92/18; H04W 76/14; H04B 7/15542; H04B 7/15557; H04B 7/026

See application file for complete search history.

(56) References Cited

U.S. PATENT DOCUMENTS

| | | | |
|---|---|---|---|
| 2010/0278136 A1* | 11/2010 | Oyman | H04W 52/146 370/330 |
| 2014/0269417 A1* | 9/2014 | Yu | H04W 24/02 370/254 |
| 2017/0126306 A1 | 5/2017 | Kim et al. | |
| 2018/0152915 A1* | 5/2018 | Kalhan | H04W 88/04 |
| 2021/0127404 A1* | 4/2021 | Ryu | H04B 7/0452 |
| 2022/0224457 A1* | 7/2022 | Ebrahim Rezagah | H04L 1/08 |

* cited by examiner

COOPERATIVE RELAY IN SIDELINK NETWORKS

CROSS REFERENCE TO RELATED APPLICATION(S)

This application claims the benefit of U.S. Provisional Patent Application Ser. No. 63/083,047, entitled "COOPERATIVE RELAY IN SIDELINK NETWORKS" and filed on Sep. 24, 2020, which is expressly incorporated by reference herein in its entirety.

BACKGROUND

Technical Field

The present disclosure relates generally to communication systems, and more particularly, to cooperative relay in sidelink networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communication systems, a base station may provide a user equipment (UE) with access to a core network. In some aspects, the UE may be outside of a coverage area of the base station, which may impede access to the core network from the UE through the base station. In some aspects, a UE may connect to a base station through a relay device, for example, when the UE is out of a coverage area, unable to decode signals from the base station due to interference, or the like. However, uplink coverage through a single relay device between the UE and the base station in a multi-hop scenario may be limited.

It has been found that performance of a user equipment (UE) at cell edges may be significantly improved by employing cooperative sidelink relaying, when direct transmission cannot be successfully pursued between the UE and a serving base station. Sidelink cooperative relay transmission may include synchronous or asynchronous, distributed sidelink relaying of UE sidelink data by multiple UEs configured as relays in a network.

Aspects of the present disclosure provide mechanisms to manage various resources to achieve cooperative sidelink relaying with advantages over standard relay communication systems. For example, the subject technology provides diversity gain and power gain over a single relay scenario with increased reliability and coverage of the relay link to the base station. If the destination is a base station (e.g., gNB), then the subject technology can be used as a technique to improve uplink coverage, albeit at the cost of latency (e.g., over two-hop transmissions).

In an aspect of the disclosure, a method, a computer-readable medium, and an apparatus are provided. The apparatus can receive, from a second UE, a groupcast signal comprising a resource allocation assigned to a plurality of sidelink UEs including the first UE. The apparatus also can communicate, with a remote apparatus on a first resource included in the resource allocation, a first relay signal comprising at least a portion of the groupcast signal, in which the first relay signal corresponds to at least a portion of a second relay signal communicated with the remote apparatus on a second resource included in the resource allocation by at least one other sidelink UE of the plurality of sidelink UEs.

In another aspect of the disclosure, a method, a computer-readable medium, and an apparatus are provided. The apparatus can determine a resource allocation assigned to a plurality of second UEs for forwarding data between the first UE and a remote apparatus through a cooperative relay with the plurality of second UEs. The apparatus also can transmit, to the plurality of second UEs on a first resource over a sidelink channel, a groupcast signal comprising the resource allocation.

In yet another aspect of the disclosure, a method, a computer-readable medium, and an apparatus are provided. The apparatus can receive, from a plurality of first user equipments (UEs), a plurality of relay signals that are cooperatively relayed through respective ones of the plurality of first UEs. The apparatus also can decode each of the plurality of relay signals to recover a respective portion of a groupcast signal originating from a second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
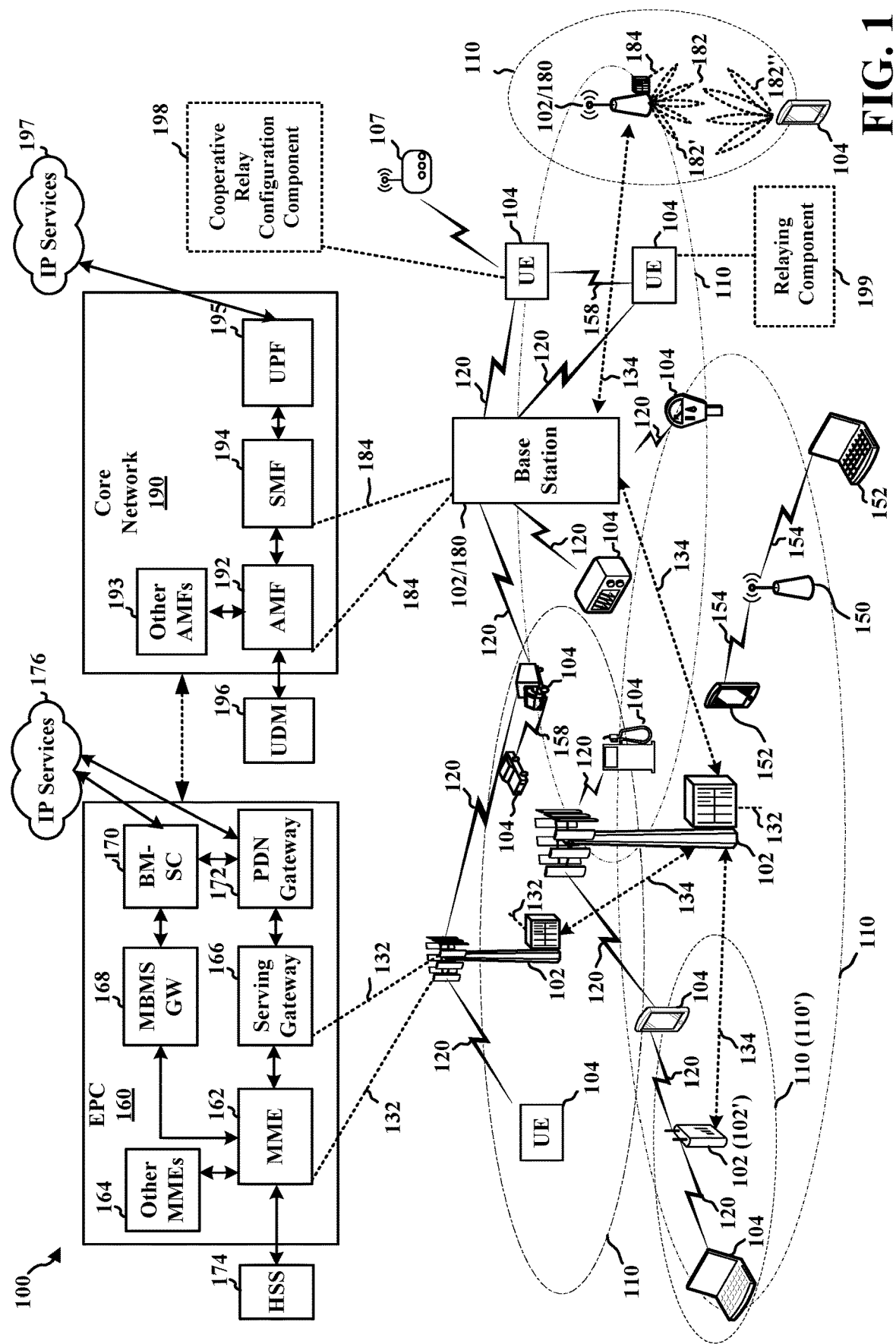
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. Some wireless communication may be exchanged directly between wireless devices based on sidelink. The communication may be based on vehicle-to-anything (V2X) or other device-to-device (D2D) communication, such as Proximity Services (ProSe), etc. Sidelink communication may be exchanged based on a PC5 interface, for example.

In sidelink communication, control information may be indicated by a transmitting UE in multiple SCI parts. The SCI may indicate resources that the UE intends to use, for example, for a sidelink transmission. The UE may transmit a first part of control information indicating information about resource reservation in a physical sidelink control channel (PSCCH) region, and may transmit a second part of the control information in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, control information may be indicated through a combination of the first SCI part included in the PSCCH region (e.g., the SCI-1) and the second SCI part included in the PSSCH region (e.g., the SCI-2). In other aspects, control information may be indicated in a media access control (MAC) control element (MAC-CE) portion of the PSSCH.

Some examples of sidelink communication may include vehicle-based communication such as vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as V2X communications. As an example, in FIG. 1, a UE 104, e.g., a transmitting Vehicle User Equipment (VUE) or other UE 104, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include a Access and Mobility Management Function (AMF) 192, other AMfs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Further, although the present disclosure may focus on vehicle-to-pedestrian (V2P) communication and pedestrian-to-vehicle (P2V) communication, the concepts and various aspects described herein may be applicable to other similar areas, such as D2D communication, IoT communication, vehicle-to-everything (V2X) communication, or other standards/protocols for communication in wireless/access networks.

Figure 2:
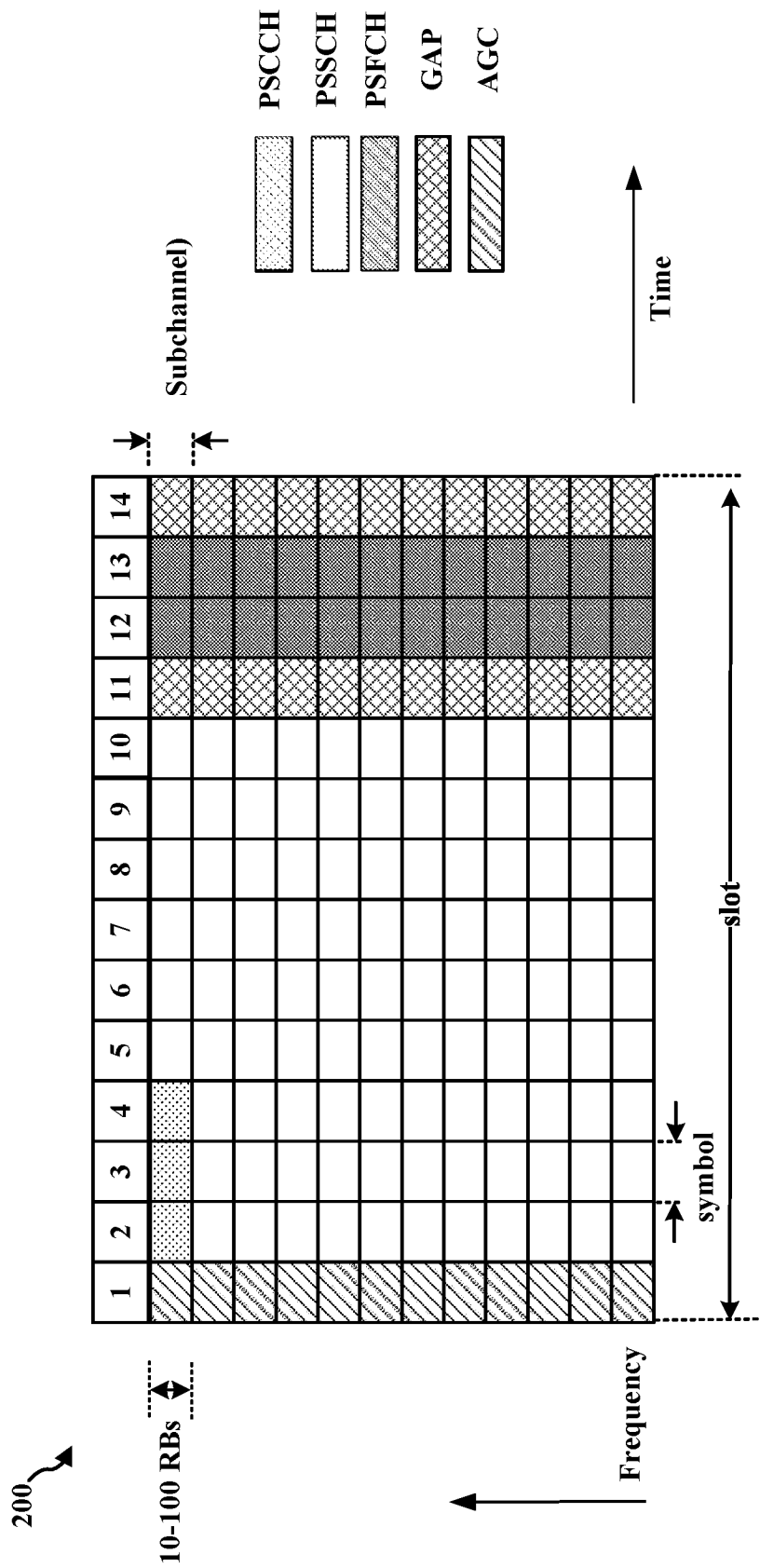
FIG. 2 illustrates example aspects of a sidelink slot structure.

FIG. 2 illustrates example diagram 200 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI).

Figure 12:
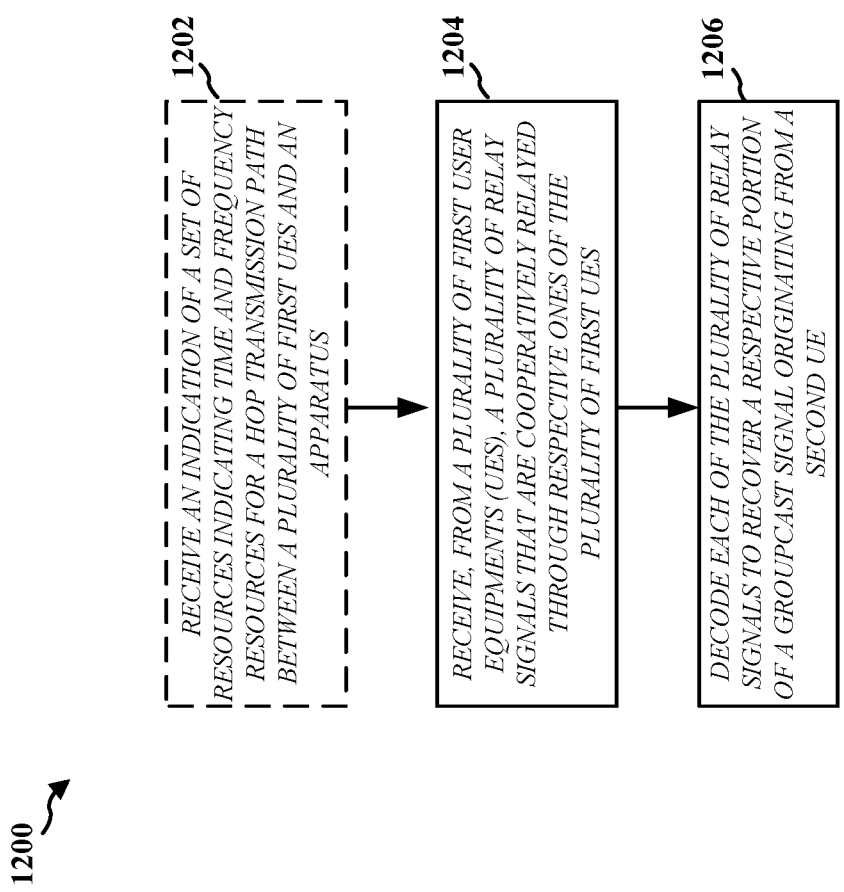
FIG. 12 is a flowchart of a process of wireless communication, in accordance with one or more of aspects of the present disclosure.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 200 also illustrates multiple subchannels, where each subchannel may include multiple RBs. For example, one subchannel in sidelink communication may include 10-100 RBs. As illustrated in FIG. 2, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 2 also illustrates symbol(s) that may include PSSCH. The symbols in FIG. 2 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 12, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 12, symbol 10 includes a gap symbol to enable turnaround for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 2.

Figure 3:
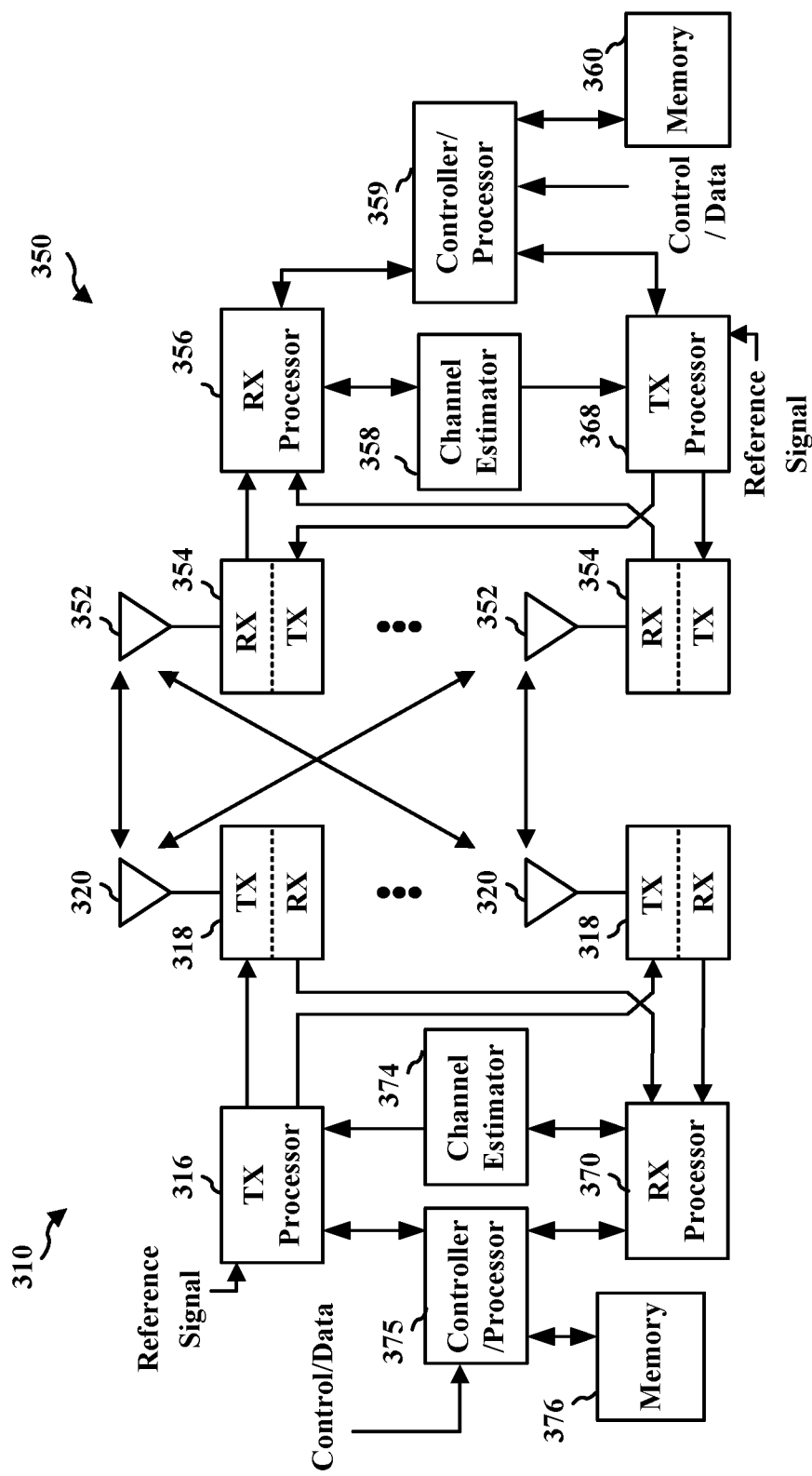
FIG. 3 is a diagram illustrating an example of a first device and a second device involved in sidelink communication.

FIG. 3 is a block diagram of a first wireless communication device 310 in communication with a second wireless communication device 350. The communication may be based on sidelink, e.g., using a PC5 interface. In some examples, the devices 310 and 350 may communicate based on V2X or other D2D communication. The devices 310 and the 350 may include a UE, an RSU, a base station, etc. In some examples, the device 310 may be a UE and the device 350 may be a UE. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, or the controller/processor 359 of device 350 or the TX 316, the RX processor 370, or the controller/processor 375 may be configured to perform aspects described in connection with the cooperative relay configuration component 198 and/or the relaying component 199 of FIG. 1.

Figure 4:
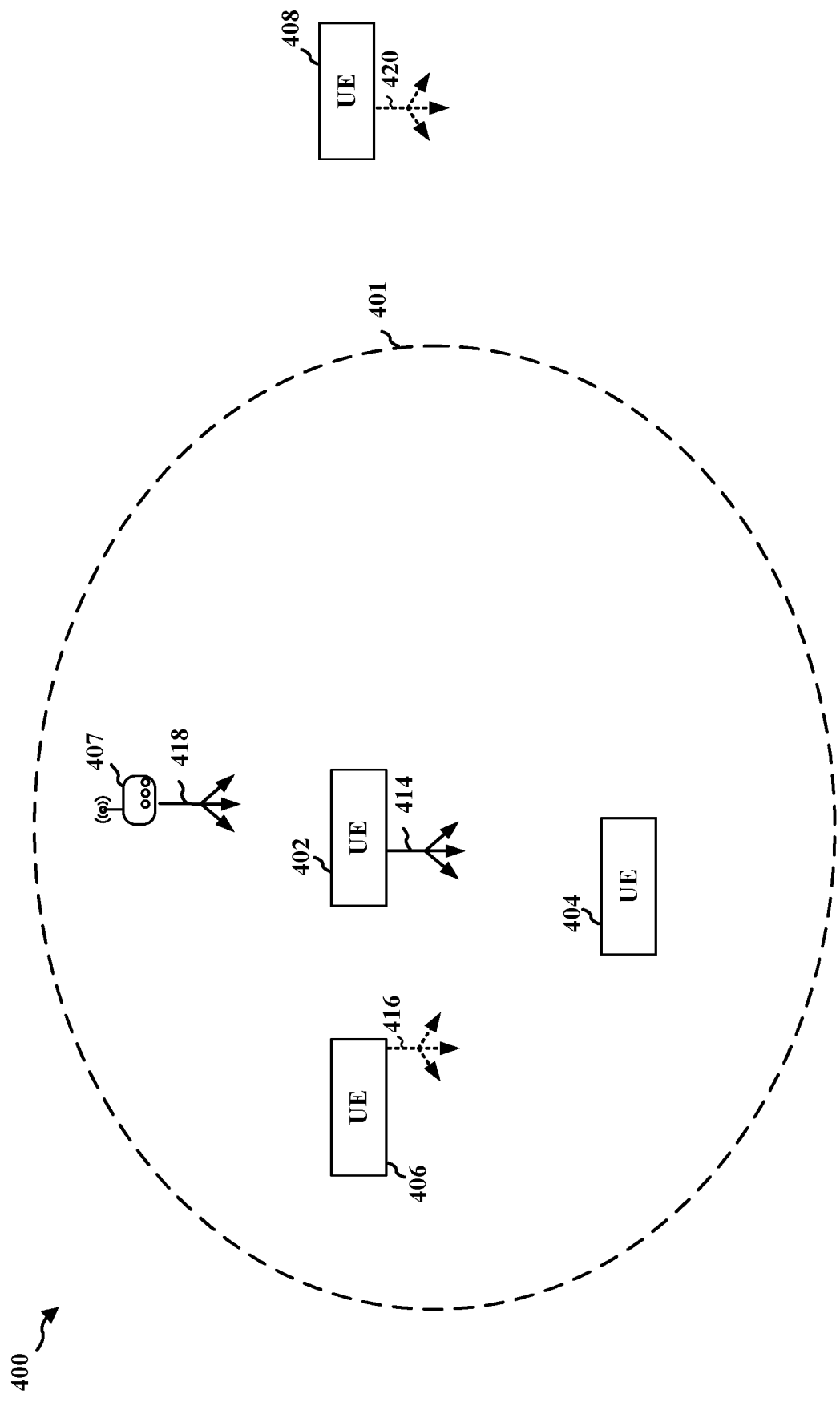
FIG. 4 illustrates an example of sidelink communication between wireless devices, in accordance with one or more of aspects of the present disclosure.

FIG. 4 illustrates an example 400 of sidelink communication between wireless devices. The communication may be based on a slot structure comprising aspects described in connection with FIG. 2 or another sidelink structure. Although the example in FIG. 4 is described for the UEs 402, 404, 406, 408, aspects may be applied to other wireless devices configured for communication based on sidelink, such as an RSU, an IAB node, etc. As illustrated in FIG. 4, a transmitting UE 402 may transmit a transmission 414 comprising a control information (e.g., sidelink control information (SCI)) and/or a corresponding data channel, that may be received by receiving UEs 404, 406, 408. The SCI may include information for decoding the corresponding data and may also be used by receiving device to avoid interference by refraining from transmitting on the occupied resources during a data transmission. For example, the SCI may reserve resources for sidelink communication. The number of TTIs, as well as the RBs that will be occupied by the data transmission, may be indicated in SCI from the transmitting device. The UEs 402, 404, 406, 408 may each be capable of operating as a transmitting device in addition to operating as a receiving device. Thus, the UEs 406, 408 are illustrated as transmitting transmissions 416 and 420. The transmissions 414, 416 or 420 may be broadcast or multicast to nearby devices. For example, the UE 402 may transmit communication intended for receipt by other UEs within a range 401 of the UE 402. In other examples, the transmissions 414, 416, or 418 may be groupcast to nearby devices that a member of a group. In other examples, the transmissions 414, 416, or 420 may be unicast from one UE to another UE. Additionally or alternatively, the RSU 407 may receive communication from and/or transmit communication 418 to the UEs 402, 404, 406, 408.

The UE 402, 404, 406, 408 and/or the RSU 407 may include a cooperative relay configuration component, similar to the cooperative relay configuration component 198 described in connection with FIG. 1. The UE 402, 404, 406, 408 and/or the RSU 407 may additionally or alternatively include a relaying component, similar to the relaying component 199 described in connection with FIG. 1.

Resource allocation refers to how a resource is allocated to a device to use for transmitting a packet. In sidelink communication, resource allocation may be performed in a centralized manner (Mode 1) or a distributed manner (Mode 2). When operating using Mode 1, resource allocations for sidelink communication are determined by a base station. For example, the base station may transmit an indication to a UE that indicates the resources that are allocated to the UE to use to transmit sidelink communication (e.g., sidelink data packets to other UEs). When operating using Mode 2, the resource allocations for sidelink communication are determined by the communicating UE. For example, a transmitting UE may autonomously determine resource allocations for transmitting sidelink control and data to one or more receiving UEs. When operating using Mode 2 (e.g., in a distributed manner), the transmitting UE may determine the resources to use for communicating from a resource pool. A resource pool refers to a collection of time and/or frequency resources on which sidelink communication may occur.

As shown in FIG. 4, a transmitter (Tx) UE 402 and a receiver (Rx) UE 404 may communicate with one another via a sidelink. In some sidelink modes, a base station 102/180 may communicate with the Tx UE 402 via a first access link (not shown). Additionally, or alternatively, in some sidelink modes, the base station 102/180 may communicate with the Rx UE 404 via a second access link (not shown). The Tx UE 402 and/or the Rx UE 404 may correspond to one or more UEs described elsewhere herein, such as the UE 104 of FIG. 1. Thus, a direct link between UEs 104 (e.g., via a PC5 interface) may be referred to as a sidelink, and a direct link between a base station 102/180 and a UE 104 (e.g., via a Uu interface) may be referred to as an access link. Sidelink communications may be transmitted via the sidelink, and access link communications may be transmitted via the access link. An access link communication may be either a downlink communication (from a base station 102/180 to a UE 104) or an uplink communication (from a UE 104 to a base station 102/180).

As described above, the UE 402 may operate in Mode 1, in which resource selection and/or scheduling is performed by the base station 102/180. That is, in Mode 1, the base station 102/180 assigns resources for transmitting sidelink communications. In particular, the base station 102/180 may transmit downlink control information (DCI) (e.g., in DCI format 3_0) that indicates a resource allocation (e.g., time and/or frequency resources) and/or a transmission timing. In Mode 1, a MCS value for sidelink transmissions may be selected by a UE 402 (e.g., within limits set by the base station 102/180). Moreover, Mode 1 may support dynamic grants or configured grants for scheduling sidelink transmissions. The configured grants may be type 1 (e.g., which may be activated by the base station 102/180 via radio resource control (RRC) signaling) or type 2.

As described above, the UE 402 may operate in Mode 2, in which resource selection and/or scheduling is performed by the UE 402. That is, the transmitting UE 402 may autonomously determine resources for sidelink transmissions. In this case, the transmitting UE 402 may perform channel sensing by performing blind decoding of all PSCCH channels in order to determine resources that are reserved for sidelink transmissions (e.g., by other transmitting UEs). In this way, the transmitting UE 402 may determine available resources, which may be reported to an upper layer of the transmitting UE 402 where resource usage is determined. The receiving UE 404 operates according to the same behavior in Mode 1 or Mode 2. In some aspects, the UE 402 may perform resource selection and/or scheduling by sensing channel availability for transmissions. For example, the UE 402 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Figure 5:
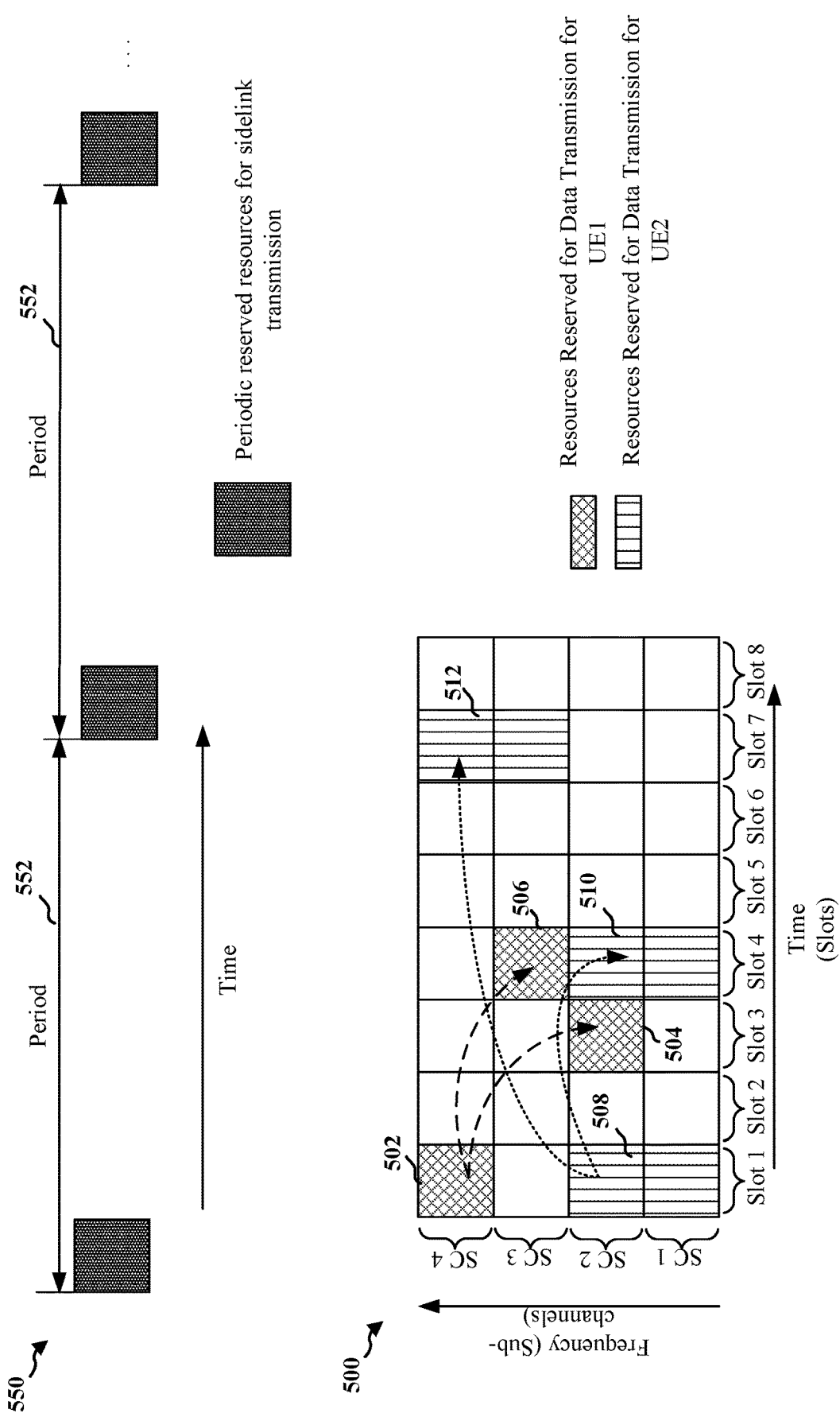
FIG. 5 is a diagram illustrating an example of resource reservations, in accordance with one or more of aspects of the present disclosure.

The radio resource allocation for a sidelink communication may be based on resource reservations. For instance, when a UE is preparing to transmit data on sidelink, the UE may first determine whether resources are reserved by other UEs. Then, the UE may reserve resources from the remaining unreserved resources that are available. FIG. 5 is a diagram 500 illustrating an example of resource reservations for sidelink transmissions. The resource allocation for each UE may be in units of one or more subchannels in the frequency domain (e.g., subchannels SC 1 to SC 4), and may be based on one time slot in the time domain. The UE may also use resources in the current slot to perform a first transmission, and may reserve resources in future slots for retransmissions. In this example, up to two different future slots may be reserved by the UEs (e.g., UE1 and UE2) for retransmissions. The resource reservation may be limited to a window of pre-defined slots and subchannels, such as an example eight time slots by four subchannels window, as shown in diagram 500, which provides 32 available resource blocks in total. This example window may also be referred to as a "resource selection window." Each resource block in the resource selection window may be used to transmit both data and control information together.

FIG. 5 also illustrates an example of time frequency resources that may be available for sidelink communication. A resource pool may be either preconfigured (e.g., preloaded on a UE), configured by a base station, or otherwise determined by the UE. In some examples, a transmitting UE may randomly select resources from a resource pool for a transmission. In such examples, receiving UEs may continuously monitor candidate resources to receive a communication. Additionally, in some examples, if a nearby UE randomly selects the same resource, a collision or interference may occur.

In some examples, a UE may use historical resource utilization of other UEs to predict future activity. For example, by identifying that a first UE transmits periodically and what resources the first UE uses when transmitting, a second UE may determine on which resources future transmissions by the first UE may occur and also when they may occur. FIG. 5 also illustrates an example of period resource 550 that may be reserved by a UE for sidelink communication. Thus, by "listening" to other UE activity in the past (e.g., historical resource utilization), the second UE may predict future activity of the other UEs and can select a resource to use for a transmission that is less likely to result in a collision and/or interference.

However, it may be appreciated that for the second UE to identify historical resource utilization, the second UE may operate in an "always-on" mode to facilitate sensing or receiving of transmission by the other UEs. The continual monitoring by the second UE increases power consumption or processing resources in order to identify historical resource utilization and to predict future activity.

In some examples, a UE may perform partial sensing for determining historical resource utilization of other UEs. When performing partial sensing, the UE may selectively sense a subset of resources and, thus, may reduce power consumption in comparison to monitoring the set of resources. However, partial sensing may not be effective when transmissions by other UEs are not periodic. For example, a UE employing partial sensing may miss information about aperiodic transmissions and, thus, may be unable to accurately predict future activity of the other UEs based on a determined historical resource utilization.

In one example, a first UE ("UE1") may reserve a subchannel (e.g., SC 4) in a current slot (e.g., time slot 1) for an initial data transmission (e.g., resource 502), and may reserve additional future slots within the resource selection window for data retransmissions (e.g., resources 504, 506). For example, UE1 may reserve a subchannel SC 2 at time slot 3 (e.g., the resource 504) for a first future retransmission and may reserve a subchannel SC 3 at time slot 5 (e.g., the resource 506) for a second future retransmission, as shown by FIG. 5. UE1 may then transmit information regarding which resources are being used and/or reserved by UE1 to other UE(s), such as by including reservation information in a reservation resource field of the SCI (e.g., a first stage SCI). In some examples, the UE may be configured to use the SCI to reserve one, two, or three transmissions. In some examples, a maximum number of reservations allowed for a UE may be pre-configured for the UE. For example, a UE may be pre-configured to reserve up to three transmissions within a resource selection window.

As illustrated by FIG. 5, a second UE ("UE2") may also reserve resources in subchannels SC 1 and SC 2 at time slot 1 (e.g., resource 508) for a current data transmission. UE2 may also reserve subchannels SC 1 and SC 2 at time slot 4 (e.g., resource 510) to use for transmitting a first data retransmission, and may reserve subchannels SC 3 and SC 4 at time slot 7 (e.g., resource 512) to use for transmitting a second data retransmission, as shown by FIG. 5. Similar to the example of UE1, UE2 may then transmit information regarding the resource usage and/or reservation information to other UE(s), such as by using the reservation resource field in SCI. In some examples, a UE may be configured to make reservations using a same number of subchannels (e.g., bandwidth). For example, the resources 502, 504, 506 reserved by UE1 have a same number of subchannels (e.g., 1), and the resources 508, 510, 512 reserved by UE2 have a same number of subchannels (e.g., 2). However, the starting subchannel for each reserved resource may be different. For example, the initial data transmission may start at subchannel SC 4, the first future retransmission may start at subchannel SC 2, and the second future retransmission may start at subchannel SC3, etc.

Figure 6:
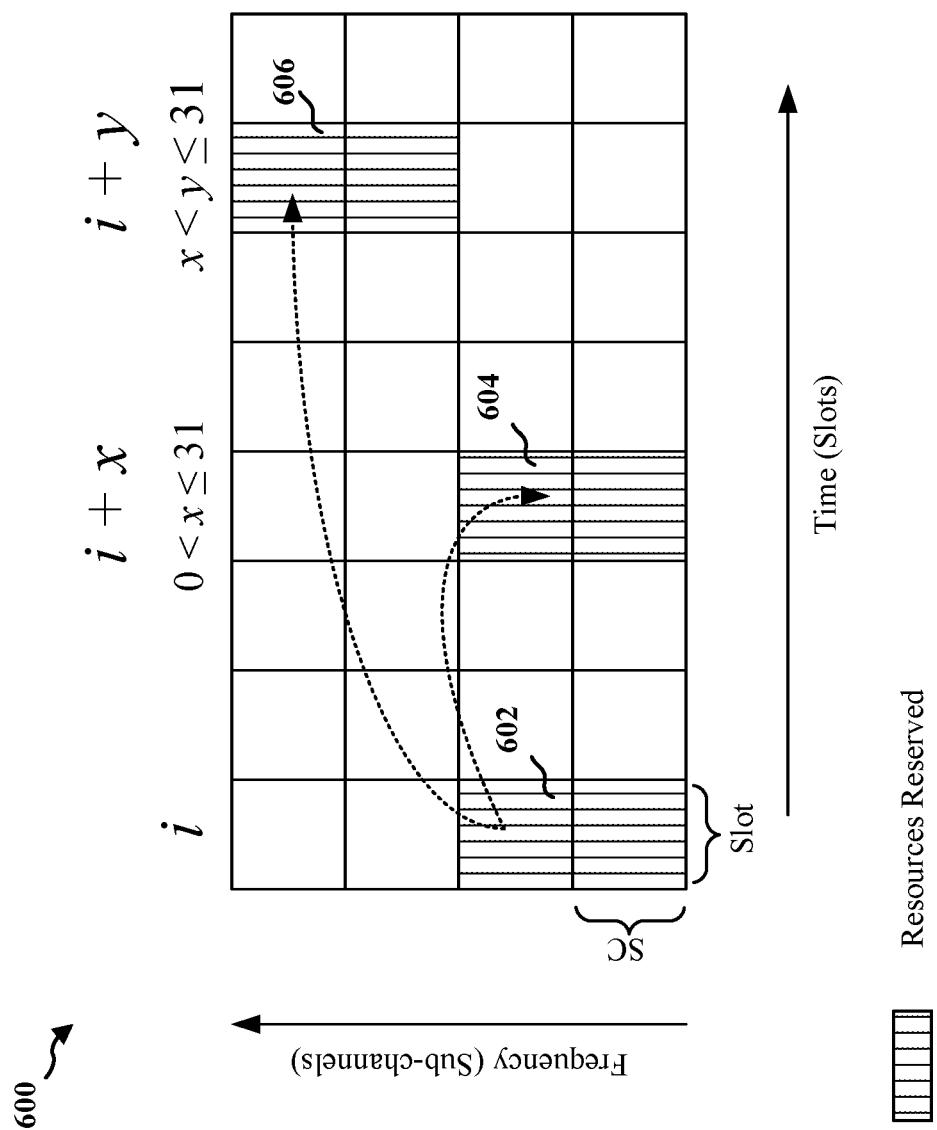
FIG. 6 is a diagram illustrating an example of resource reservation, in accordance with one or more of aspects of the present disclosure.

FIG. 6 is a diagram 600 illustrating an example of a resource reservation process. When a UE (e.g., sidelink transmitting UE) is using a first resource 602 for transmission at time slot i in a period (such as period 552 illustrated in FIG. 5), the UE may reserve two more resources within the same period, such as a first future resource 604 at time slot i+x and a second future resource 606 at time slot i+y. Each of the reserved resources 602, 604, 606 may be associated with a number z of subchannels. For example, if the period has 32 slots with slot index 0 to 31, the UE may transmit using the first resource 602 at time slot 0 with z subchannels, and may reserve the first future resource 604 with z subchannels at time slot i+x, where x is 0<x≤31. The UE may also reserve the second future resource 606 with z subchannels at time slot i+y, where y is x<y≤31. Table 1 (below) illustrates example reservations signaled by the SCI of the UE in time slot i corresponding to FIG. 6.

TABLE 1

Reservations Signaled By An SCI In Time Slot i

| Reservation | Number of Subchannels | Time Slot |
|---|---|---|
| 1 | z | i |
| 2 | z | i + x: 0 < x ≤ 31 |
| 3 | z | i + y: x < y ≤ 31 |

The UE may use the first reserved future resource 604 and the second reserved future resource 606 for retransmission, such as when a first transmission using the first resource 602 fails. The UE may additionally or alternatively use one or both of the reserved future resources 604, 606 for purposes other than retransmission.

A UE using a reserved resource for transmission may request feedback with respect to the transmission from other UE(s) or base station(s). Based on the feedback from other UE(s) or base station(s), the UE may elect not to use a reserved resource. For example, a transmitting UE may use the first resource 602 for a data transmission, and may request a receiving UE or a base station receiving the data transmission to provide feedback to the transmitting UE. If the transmitting UE receives feedback from the receiving UE or the base station confirming receipt of the data transmission, the transmitting UE may elect not to use the reserved future resources 604, 606, which may have been originally reserved for retransmissions of the data transmission.

The sidelink resource reservation may be periodic or aperiodic. For example, a UE may periodically reserve resources, such as by indicating a reservation period in an SCI or in one part of the SCI (e.g., a first state control (SCI-1)). Thus, when the periodic resource reservation is enabled, the reservations indicated by the SCI may be repeated with the signaled period. In some examples, if the resource reservation is periodic, the reservation period may be configured to values between 0 milliseconds (ms) and 1000 ms by signaling in the SCI, and the periodic resource reservation may additionally or alternatively be disabled by a (pre-)configuration. In some examples, each reservation of resources may have a priority level indicated in the SCI. In some such example, a higher priority reservation may pre-empt a lower priority reservation.

In sidelink communication, a resource reservation may be indicated by a transmitting UE in multiple SCI parts. The SCI may indicate resources that the UE intends to use, for example, for a sidelink transmission. The UE may transmit a first part of the reservation in a physical sidelink control channel (PSCCH) region, and may transmit a second part of the reservation in a PSSCH region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, multiple resources may be indicated (or reserved) through a combination of the first SCI part included in the PSCCH region (e.g., the SCI-1) and the second SCI part included in the PSSCH region (e.g., the SCI-2). For example, the first SCI part in the PSCCH may reserve resource(s) for a UE in a PSSCH, and the first SCI part may also indicate to a receiving UE that there is a second SCI part or more (e.g., two-stage control SCI) in the PSSCH. The second SCI part may reserve other resources, provide signaling, and/or provide information to the receiving UE that may be unrelated to the resources reserved in the first SCI part.

Figure 7:
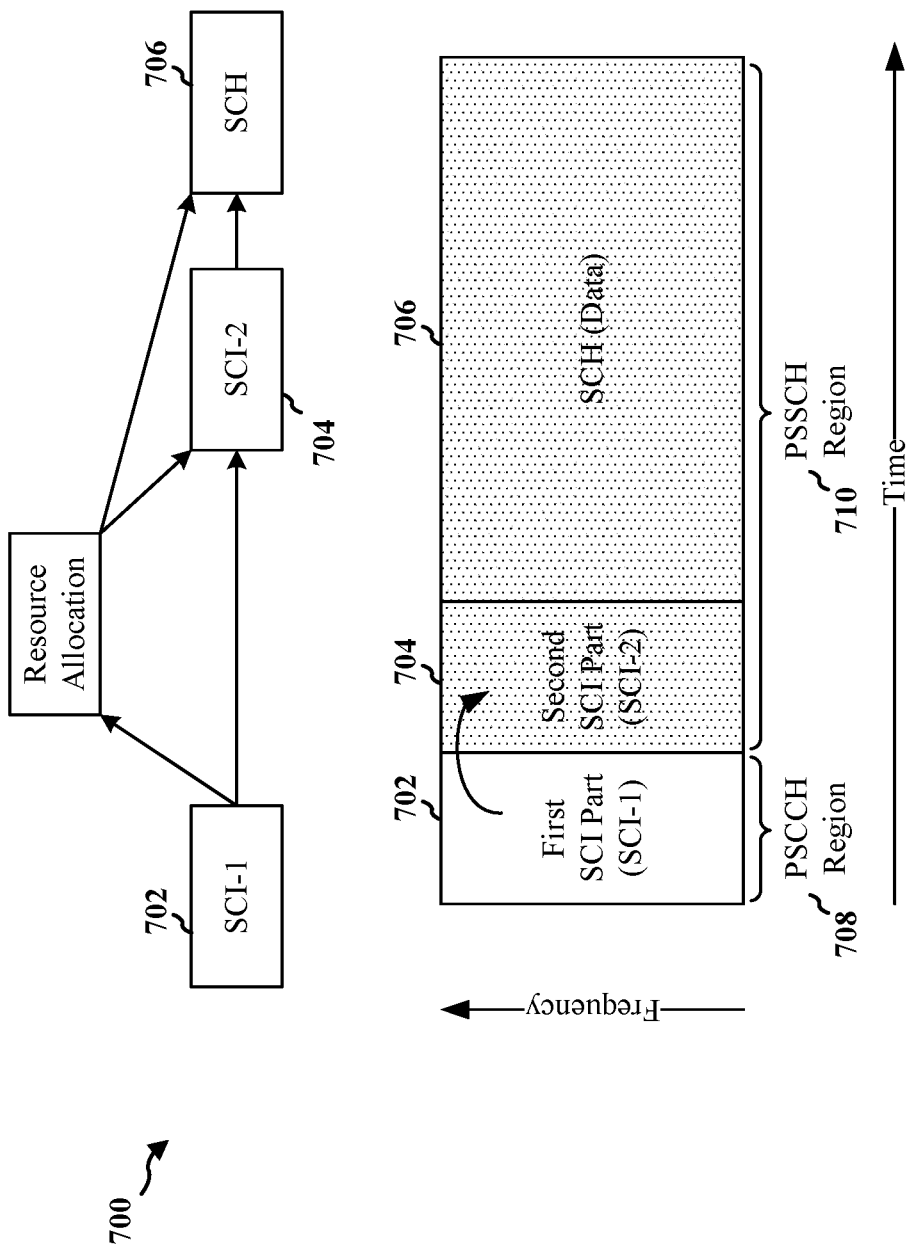
FIG. 7 is a diagram illustrating an example of two-stage physical sidelink control channel (PSCCH), in accordance with one or more of aspects of the present disclosure.

FIG. 7 is a diagram 700 illustrating an example of a two-stage SCI. To reduce control overhead and to improve the processing timeline, SCI used for sidelink grant(s) may be split into two or more parts. In the illustrated example, a first SCI part 702 (e.g., SCI-1) may be transmitted within a control region (e.g., a PSCCH region 708) and a second SCI part 704 (e.g., SCI-2) may be transmitted within a sidelink traffic region (e.g., a PSSCH region 710). The PSCCH region 708 and the PSSCH region 710 may together form one slot. The first SCI part 702 may include initial control information regarding a sidelink transmission, such as a resource assignment (RA) in SCH 706 or other resource reservation information in future slots, rank and modulation order of the sidelink assignment, a bandwidth for the PSSCH region 710, and/or the like. The first SCI part 702 is intended for all UEs to decode, particularly for Mode 2 UEs to avoid resource collisions. In addition, the first SCI part 702 may include control information about the second SCI part 704. In some examples, the control information may indicate the number of resource elements (or size) and code rate of the second SCI part 704. The control information may further indicate the location (e.g., starting resource element) and code rate of the second SCI part 704. In one aspect, the first SCI part 702 (e.g., SCI-1) format may include one or more of the following information: a priority (QoS value), frequency domain resource allocation (FDRA), time domain resource allocation (TDRA), a PSSCH resource assignment (e.g., frequency/time resource for PSSCH), a resource reservation period (e.g., if enabled), a PSSCH DMRS pattern (e.g., if more than one pattern is configured), a second SCI format (e.g. information on the size of the second SCI part), a 2-bit beta offset for second stage control resource allocation, a number of PSSCH DMRS port(s) (e.g., 1 or 2), a 5-bit MCS and/or reserved bits. In one aspect, the second SCI part 704 (e.g., SCI-2) format may include one or more of the following information: hybrid automatic repeat request (HARQ), redundancy version (RV) identifiers, new data indicator (NDI), etc. The second SCI part 704 may include the remaining control information regarding the sidelink assignment. For example, the remaining control information may include non-time critical control information or other resource allocation(s) for data transmission in SCH 706, such as the source and destination ID for the data transmission.

In some implementations, sidelink communications may use a resource pool that includes one or more subchannels (e.g., subchannels SC 1 to SC 4). Accordingly, to receive a sidelink packet, a receiving UE performs blind decoding in all subchannels of the resource pool. A quantity of subchannels in a resource pool may be relatively small (e.g., 1-27 subchannels, as described above), so that blind decoding all subchannels is feasible for a UE. In C-V2X, for example, the UEs are intended to decode all transmissions using blind decoding of all subchannels. In some examples, the subchannel size in V2X is relatively large (e.g., minimum 10 RBs).

In some implementations, a PSCCH in the PSCCH region 708 and a PSSCH in the PSSCH region 710 may be transmitted in the same slot. The PSSCH region 710 may occupy contiguous subchannels up to the total quantity of subchannels in the resource pool (e.g., the PSSCH may occupy $N_{subchannel}^{SL}$). The PSCCH region 708 may occupy only one subchannel (e.g., a subchannel of the resource pool associated with the lowest subchannel index, such as SC1 of FIG. 5).

A UE may locate the PSSCH carrying the second SCI part 704 after decoding first SCI part 702 in the PSCCH region 708. The packet for the second SCI part 704 may indicate a source identifier and a destination identifier to indicate a UE that transmitted the packet and a UE for which the packet is intended.

Figure 8:
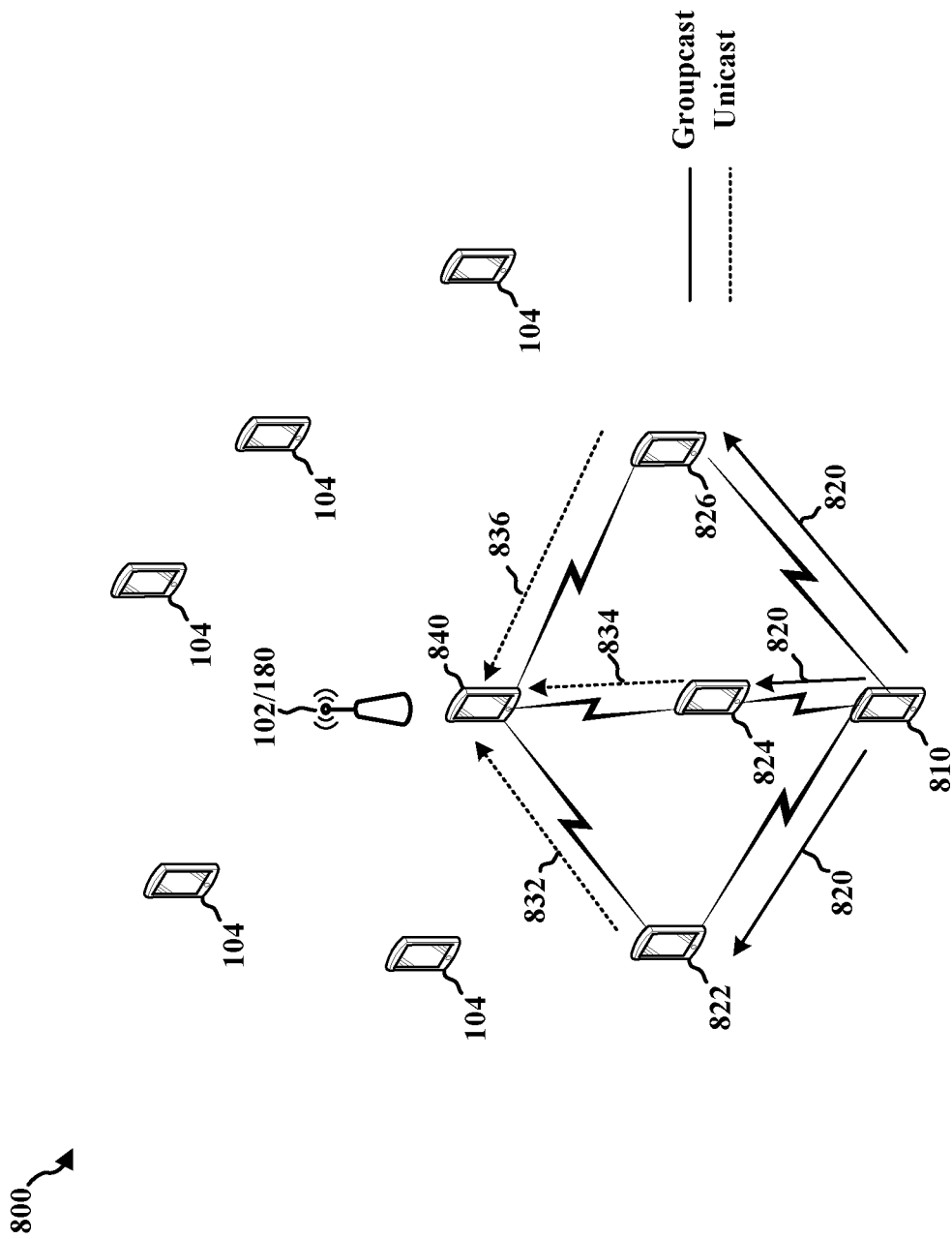
FIG. 8 is a diagram illustrating an example of cooperative relay in sidelink networks, in accordance with one or more of aspects of the present disclosure.

FIG. 8 is a diagram illustrating an example of cooperative relay in sidelink networks, in accordance with one or more of aspects of the present disclosure. The cooperative sidelink relaying may be performed via a two-step approach, where (1) a source UE transmits a groupcast signal to other sidelink UEs that serve as relaying stations, and (2) the sidelink UEs perform synchronized or asynchronized cooperative MIMO to relay the groupcast signal to a remote apparatus (e.g., other sidelink UE or base station).

As shown in FIG. 8, the source UE 810 may broadcast a groupcast signal on a sidelink broadcast link 820. The relay UEs 822, 824 and 826 may respectively receive this transmission of sidelink data from the source UE 810, and may cooperatively relay this transmission to the remote apparatus 840 on respective relay links 832, 834, 836. In certain aspects, the data transmission of source UE 810 may be transmitted to the remote apparatus 840 over multiple hops. For example, the relay UEs 822, 824, 826 may forward the data transmission to the remote apparatus 840 as unicast transmissions.

A source UE 810 may generally be able to transmit uplink data through a single relay station to a base station. However, uplink coverage through the single relay station between the source UE and the base station in a multi-hop scenario may be limited due to power constraints, UL interference from other stronger UEs in the vicinity, etc. In certain aspects of the present disclosure, the source UE 810 may participate, with one or more other sidelink UEs (e.g., UEs 822, 824, 826) in the network 800, in cooperative relay transmission to a base station (e.g., base station 102/180). If the destination is a base station (e.g., gNB), then the subject technology can be used as a technique to improve uplink coverage, albeit at the cost of latency (e.g., over two-hop transmissions). In certain aspects, the source UE 810 may communicate UL data to the base station (e.g., 840) using intermediary relay stations (e.g., UEs 822, 824, 826) to cooperatively relay the data transmitted by the source UE 810.

A first relay station (e.g., relay UEs 822, 824, 826) may receive control information that configures the first relay station and at least one other sidelink UE (e.g., UEs 822, 824, 826) as relay stations between the source UE 810 and a remote apparatus (e.g., 840). In some aspects, the remote apparatus 840 may be a sidelink UE. In other aspects, the remote apparatus 840 may be a base station.

The first relay station may receive, from the source UE 810, a groupcast signal that includes a resource allocation assigned to a plurality of sidelink UEs including the first relay station. For example, the resource allocation includes time and frequency resource allocation for the relay stations to transmit at least a portion of the groupcast signal to the remote apparatus 840. In particular, the resource allocation may indicate in which slot(s) the relay stations should transmit the at least the portion of the groupcast signal to the remote apparatus 840. The resource allocation also may indicate in what time (or symbol duration) and frequency resource (e.g., resource block), for a given slot, the relay stations should transmit the at least the portion of the groupcast signal to the remote apparatus 840. In some implementations, the resource allocation includes a first set of resources indicating first time and frequency resources for a first hop transmission path between the source UE 810 and the first relay station and a second set of resources indicating second time and frequency resources for a second hop transmission path between the first relay station and the remote apparatus 840. In some aspects, the first resource includes a plurality of physical sidelink shared channels (PSSCHs), multiplexed in time or frequency. In some aspects of receiving the groupcast signal, the first relay station can receive the groupcast signal in a first PSSCH of the plurality of PSSCHs. In some aspects, the first PSSCH includes a second stage sidelink control information (SCI-2). In this regard, the first relay station may receive the resource allocation in a common portion of the SCI-2 when the synchronous relay mode is selected. Alternatively, the relay station may receive the resource allocation in a UE-specific portion of the SCI-2. In other aspects, the first relay station may receive the resource allocation in the MAC-CE of the first PSSCH.

In some implementations, the at least a portion of the groupcast signal includes a second stage sidelink control information (SCI-2). In some aspects of receiving the groupcast signal, the wireless communication device may receive a common virtual relay identifier in the SCI-2. In some aspects, the common virtual relay identifier is equivalent between the first relay station and the at least one other sidelink UE.

The first relay station may determine whether the first relay station operates in a synchronous relay mode or an asynchronous relay mode with the at least one other sidelink UE based on at least a portion of the groupcast signal. The relay station may determine that the first relay station operates in the synchronous relay mode with the at least one other sidelink UE based on the common virtual relay identifier being received in the SCI-2. The relay station may forward the common virtual relay identifier in the first relay signal that is equivalent to a relay identifier included in the second relay signal based on the synchronous relay mode between the first relay station and the at least one other sidelink UE.

In some implementations, the source UE 810 may select between a synchronous relay mode or an asynchronous relay mode based on a sidelink synchronization procedure with the plurality of second UEs when the source 810 and the relay stations operate in the sidelink Mode 2 of operation, as described in reference to FIG. 4. For example, if the synchronization among all sidelink UEs is successful, then the source UE 810 can set up the cooperative relay mechanism as a synchronized relay. If all of the relay UEs do not synchronize successfully, then the source UE 810 can set up the cooperative relay as an asynchronous relay. In some implementations, if not all relay UEs synchronize successfully (i.e., some relay UEs may synchronize successfully), then the source UE 810 can set up a hybrid synchronization relay mode, where some of the relay UEs operate in the synchronized relay mode and another portion of the relay UEs operate in the asynchronized relay mode. The source UE 810 may send separate resource allocation for each relay mode, which may add cost and/or complexity to overhead sidelink signaling (e.g., SCI).

The first relay station may transmit a unique relay identifier in the first relay signal that is different from a relay identifier included in the second relay signal based on an asynchronous relay mode between the first relay station and the at least one other sidelink UE. In some aspects, the first relay station may determine the unique relay identifier independent of the base station and/or the other sidelink UEs.

The first relay station may transmit an indication of the second set of resources to the remote apparatus so that the remote apparatus combines the first relay signal with the second relay signal to recover data from the source UE. In this regard, the indication may indicate whether the relay signals from the multiple relay stations may be received in a same time and frequency resource or at different time and frequency resources depending on the relay mode of operation (e.g., synchronous or asynchronous) among the relay stations. For example, a first resource used by the first relay station may include a same time and frequency resource as a second resource used by the other relay station in the synchronous relay mode. In other examples, the first resource includes a different time and frequency resource than the second resource in the asynchronous relay mode.

The first relay station may communicate, with the remote apparatus 840 on a first resource included in the resource allocation, a first relay signal that includes at least a portion of the groupcast signal. In some aspects, the first relay signal corresponds to at least a portion of a second relay signal communicated with the remote apparatus on a second resource included in the resource allocation by at least one other sidelink UE (e.g., UEs 822, 824, 826). The first relay station may transmit the first relay signal concurrently with the at least a portion of the second relay signal to the remote apparatus 840 through a relay link (e.g., relay links 832, 836). In one or more implementations, the first relay station can transmit the first relay signal as a unicast transmission to the remote apparatus 840.

In some implementations, the remote apparatus 840 may obtain log-likelihood ratio (LLR) values of each received relay signal and perform summation of the LLR values to reconstruct the original signal that originates from the source UE 810. In some aspects, when the relay stations operate in the synchronous relay mode, the remote apparatus 840 may treat each of the relay signals as a virtual single relay and receive the relay signal as a single instance. In this regard, the received relay signal at the remote apparatus 840 may be processed as: $Y=h_1*s+h_2*s+\ldots+h_N*s+noise=(h_1+h_2+\ldots+h_N)*s+noise=h_{BAR}*s+noise$. In other aspects, when the relay stations operate in the asynchronous relay mode, the remote apparatus 840 may receive the relay signals on different resources. In this regard, the received relay signals at the remote apparatus 840 may be processed as: $Y_1=h_1*s+noise_1$; $Y_2=h_2*s+noise_2$; ...; $Y_N=h_N*s+noise_N$. The remote apparatus 840 may receive the multiple relay signals at multiple times (or at different times), one from each relay station as a data source.

Figure 9:
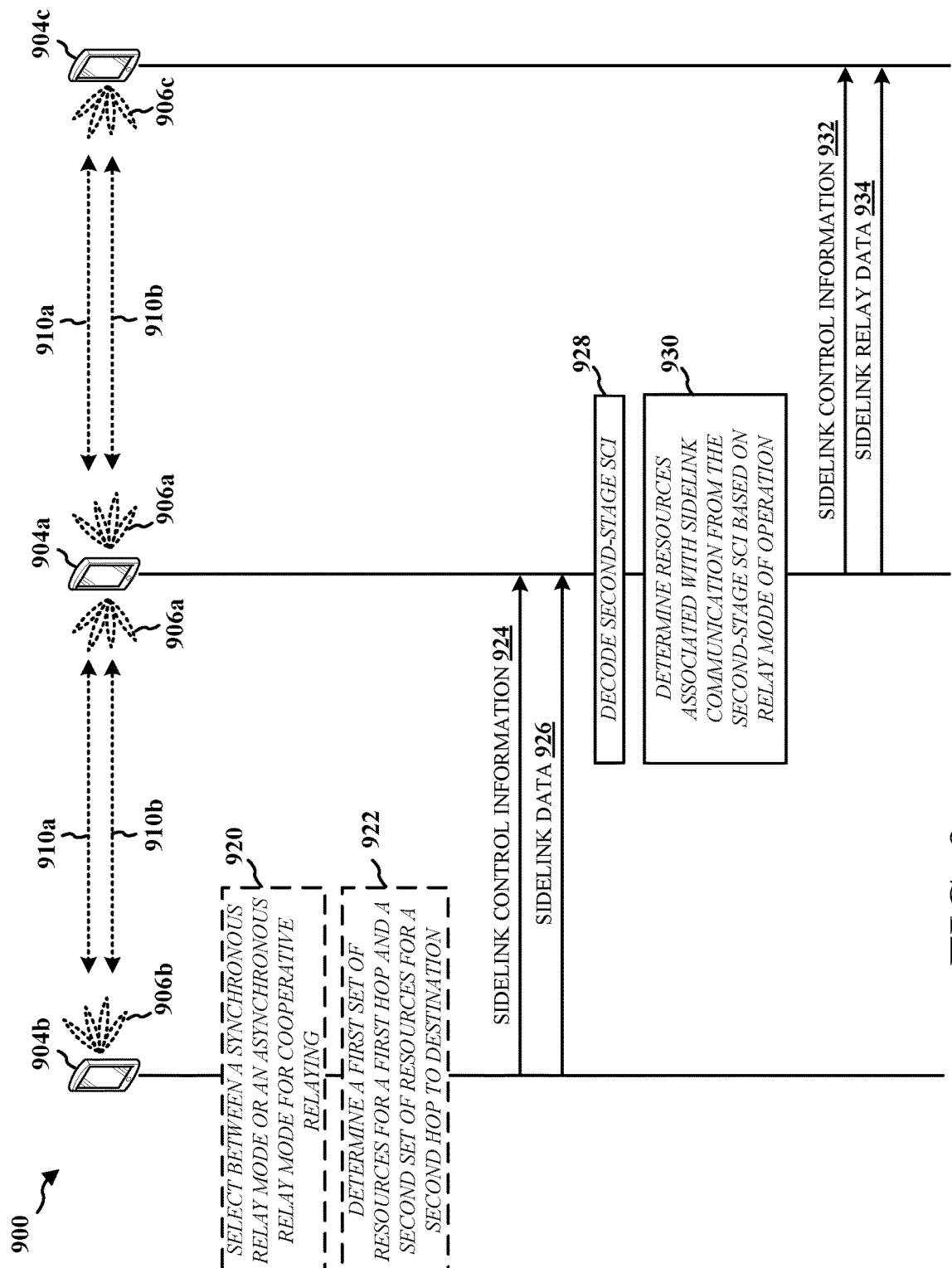
FIG. 9 is an example communication flow for cooperative relay in sidelink networks, in accordance with one or more of the teachings disclosed herein.

FIG. 9 is an example communication flow 900 for cooperative relay in sidelink networks, in accordance with one or more of the teachings disclosed herein. According to the call flow 900, a sidelink communication between UE pairs is provided, a first of which may include a UE 904a and a UE 904b and a second of which may include the UE 904a and a UE 904c. In the context of FIG. 1, each of the UEs 904a, 904b, 904c may be implemented as one of the UEs 104 in some implementations, or each of the UEs 904a, 904b may be implemented as one of the UEs 104 and the device 904c may be implemented as the BS 102/180 in other implementations. In the context of FIG. 3, each of the UEs 904a, 904b, 904c may be implemented as the UE 350 in some implementations, or each of the UEs 904a, 904b may be implemented as the UE 350 and the device 904c may be implemented as the base station 310 in other implementations.

For sidelink communication, the UEs 904a, 904b, 904c may directly communicate with one another over a sidelink. Examples of such a sidelink may include the PC5 interfaces defined for V2X in LTE and/or 5G NR. Communication on the sidelink may be carried on at least one channel.

On the sidelink, control information may be carried on a sidelink control channel 910a, such as the PSCCH. Data on the sidelink, however, may be carried on a sidelink data channel 910b, which may also be referred to as a sidelink shared channel. An example of the sidelink data channel 910b may include the PSSCH.

To directly receive data on the sidelink data channel 910b, the data may be scheduled on a set of resources on the sidelink data channel 910b. Scheduling information for the data on the sidelink data channel 910b may be carried on the sidelink control channel 910a. Thus, in order to directly communicate data on the sidelink data channel 910b, each of the UEs 904a, 904b, 904c may first receive and decode the sidelink control channel 910a.

For the sidelink communication on the allocated set of resources 922, each of the UEs 904a, 904b, 904c may identify another one of the UEs 904a, 904b, 904c, e.g., in order to establish a UE pair for sidelink communication. The UEs 904a, 904b, 904c may identify another one of the UEs 904a, 904b, 904c with which to engage in sidelink communication based on the discovery phase. The discovery phase may occur on a sidelink discovery channel (e.g., PSDCH), on which one of the UEs 904a, 904b, 904c may announce a service provided by that one of the UEs 904a, 904b, 904c while another one of the UEs 904a, 904b, 904c may determine that the announced service is of interest to that other one of the UEs 904a, 904b, 904c.

At 920, In some implementations, the UE 904b may select between a synchronous relay mode or an asynchronous relay mode based on a sidelink synchronization procedure with the plurality of second UEs when the UE 904b and the relay stations operate in the sidelink Mode 2 of operation, as described in reference to FIG. 4. For example, if the synchronization among all sidelink UEs is successful, then the UE 904b can set up the cooperative relay mechanism as a synchronized relay. If all of the relay UEs do not synchronize successfully, then the UE 904b can set up the cooperative relay as an asynchronous relay. In some implementations, if not all relay UEs synchronize successfully (i.e., some relay UEs may synchronize successfully), then the UE 904b can set up a hybrid synchronization relay mode, where some of the relay UEs operate in the synchronized relay mode and another portion of the relay UEs operate in the asynchronized relay mode. The UE 904b may send separate resource allocation for each relay mode, which may add cost and/or complexity to overhead sidelink signaling (e.g., SCI).

At 922, the UE 904b may determine a first set of resources for a first hop transmission path and a second set of resources for a second hop transmission path. In some implementations, the resource allocation includes a first set of resources indicating first time and frequency resources for a first hop transmission path between the UE 904b and the first relay station and a second set of resources indicating second time and frequency resources for a second hop transmission path between the first relay station and the UE 904c.

In the aspects illustrated by FIG. 9, the UE 904b may have first sidelink data 926 to send to the UE 904a, and the UE 904a may have second sidelink data 934 to send to the UE 904c. In order to send data on the sidelink, the UE 904a and the UE 904b may determine respective control information 924, 932 associated with the sidelink data channel 910b.

The control information 924, 932 may enable the UE 904a and the UE 904c, respectively, to successfully detect and decode the data on the sidelink data channel 910b from the UE 904b and the UE 904a. For example, the control information 924, 932 may indicate at least one of a schedule for receiving data on the sidelink data channel 910b, an MCS for communication on the sidelink data channel 910b, information associated with a HARQ process for the sidelink data channel 910b, a set of resources allocated on the sidelink data channel 910b to carry the data, and/or a TCI state associated with the sidelink data channel 910b.

The UE 904b may allocate a set of resources for sidelink communication with the UE 904a. For example, the resource allocation includes time and frequency resource allocation for the relay stations to transmit at least a portion of the groupcast signal to the UE 904c. In particular, the resource allocation may indicate in which slot(s) the relay stations should transmit the at least the portion of the groupcast signal to the remote apparatus 840. The resource allocation also may indicate in what time (or symbol duration) and frequency resource (e.g., resource block), for a given slot, the relay stations should transmit the at least the portion of the groupcast signal to the UE 904c. By allocating the set of resources for sidelink communication, the first UE 904b may reduce or prevent conflicts, interference, and the link on resources in the cell. The set of resources may include a set of PRBs and/or time/frequency resources. Sidelink communication may occur in a mmW spectrum and/or near-mmW spectrum. For example, one or more 3GPP standards for 5G NR may define communication in mmW and/or near-mmW frequencies.

During one or more slots configured for transmission by the UE 904b, the UE 904b may send the sidelink control information 924 to the UE 904a on the sidelink control channel 910a. The UE 904a may be monitoring a set of resources allocated for the sidelink control channel 910a.

The UE 904b may directly send sidelink data 926 on the sidelink data channel 910b to the UE 904a. The UE 904b may send the sidelink data 926 on the sidelink data channel 910b based on the sidelink control information 924. For example, the UE 904b may send the sidelink data 926 on the sidelink data channel 910b according to a schedule indicated in the sidelink control information 924. The schedule may indicate a first set of resources for a first hop transmission path between the UE 904b and the UE 904a.

At 928, the UE 904a may successfully detect and decode the sidelink control information 924. Based on the sidelink control information 924, the UE 904a may successfully receive and decode the sidelink data 926 on the sidelink data channel 910b.

The UE 904a may obtain various parameters from the sidelink control information 924 for sidelink communication on the sidelink data channel 910b, such as a schedule for receiving the sidelink data 926 (e.g., PSSCH) on the sidelink data channel 910b. At 928, the UE 904a may perform blind-decoding of all subchannels to identify the sidelink control information 924 and decode the sidelink control information 924, such as the SCI-2. At 930, the UE 904a can determine resources associated with sidelink communication within the cooperative relaying mechanism relative to other sidelink transmitting UE(s), as described in reference to the UEs 822, 824, 826 of FIG. 8.

During the set of slots configured for transmission by the UE 904a according to the sidelink control information 924, the UE 904a may send the sidelink control information 932 to the UE 904c on the sidelink control channel 910a. The UE 904c may be monitoring a set of resources allocated for the sidelink control channel 910a. For example, the sidelink control information 932 may include a second set of resources indicating second time and frequency resources for a second hop transmission path between the UE 904a and the UE 904c.

Subsequently, the UE 904a may directly send second sidelink data 934 on the sidelink data channel 910b to the UE 904c. The UE 904a may send the sidelink data 934 on the sidelink data channel 910b based on the sidelink control information 932. For example, the UE 904a may send the sidelink data 934 on the sidelink data channel 910b according to a schedule indicated in the sidelink control information 932. In some aspects, the sidelink data 934 includes a common virtual relay identifier when the UE 904a operates in a synchronous relay mode. In other aspects, the sidelink data 934 includes a unique relay identifier when the UE 904a operates in an asynchronous relay mode.

In a set of slots configured according to the sidelink control information 932, the UE 904c may successfully detect and decode the sidelink control information 932 on the sidelink control channel 910a. The UE 904c may obtain various parameters from the sidelink control information 932 for sidelink communication on the sidelink data channel 910b, such as a schedule for receiving the second sidelink data 934 on the sidelink data channel 910b. In some aspects, the UE 904c may receive the sidelink data 934 in the same time and frequency resource as other relay stations when the UE 904a is operating in the synchronous relay mode with other sidelink transmitting UE(s) serving as relay stations. In other aspects, the UE 904c may receive the sidelink data 934 on different time and frequency resources from the UE 904a and other relay stations when the UE 904a is operating in the asynchronous relay mode with the other sidelink transmitting UE(s).

Figure 10:
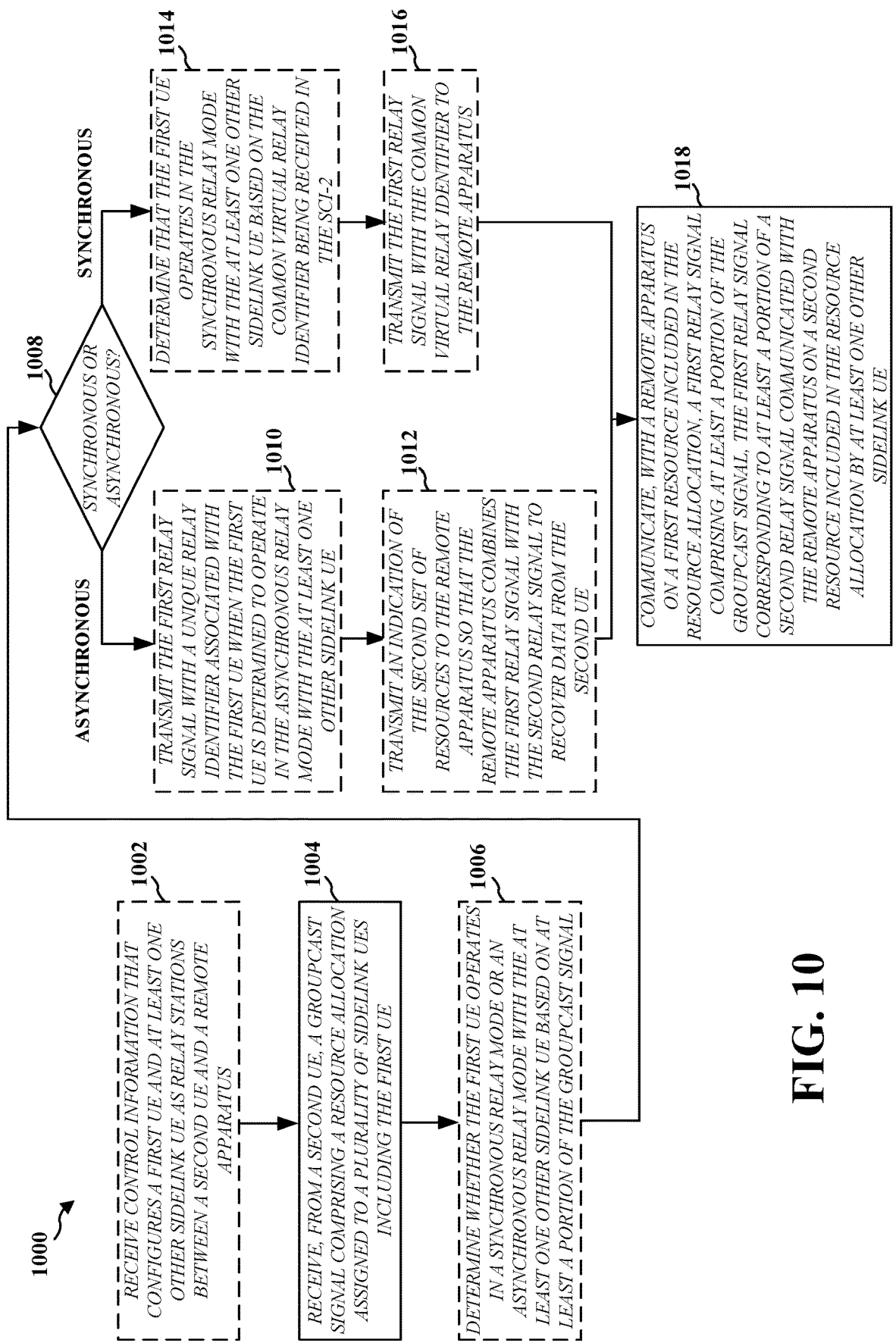
FIG. 10 is a flowchart of a process of wireless communication, in accordance with one or more of aspects of the present disclosure.

FIG. 10 is a flowchart of a process 1000 of wireless communication. The process 1000 may be performed by a wireless communication device (e.g., the UE 104, 402, 404, 406, 408; the device 350, the RSU 107, 407, UEs 822, 824, 826, UE 904a; the apparatus 1302, which may include memory, a cellular baseband processor 1304, and one or more components configured to perform the 1000). As illustrated, the process 1000 includes a number of enumerated steps, but embodiments of the process 1000 may include additional steps before, after, and in between the enumerated steps. In some embodiments, one or more of the enumerated steps may be omitted or performed in a different order. Optional aspects are illustrated with a dashed line. The process 1000 enables a wireless communication device to facilitate cooperative relaying in sidelink networks by providing sidelink control information to other sidelink transmitting UE(s) serving as relay stations to forward source UE data to a destination through a synchronous relay mode or asynchronous relay mode. The cooperative relaying through sidelink transmitting UE(s) provides diversity gain and power gain with increased reliability and coverage of the relay link between the sidelink transmitting UE(s) and the destination. Thus, the mechanism may increase uplink coverage to a base station serving as the destination or increase sidelink coverage to a sidelink receiving UE serving as the destination.

At 1002, the wireless communication device may receive control information that configures a first UE (e.g., UEs 822, 824, 826) and the at least one other sidelink UE (e.g., UEs 822, 824, 826) as relay stations between a second UE (e.g., UE 810) and a remote apparatus (e.g., 840). In some aspects, the remote apparatus may be a UE. In other aspects, the remote apparatus may be a base station. The control information may be received, e.g., by the configuration component 1340 of the apparatus 1302 through the reception component 1330 of the apparatus 1302 in FIG. 13.

In some implementations, the first UE and the at least one other sidelink UE operate in a first mode of sidelink communication, as described in reference to FIG. 4. In this regard, the wireless communication device can receive a downlink configuration from a base station at a first time. In some aspects of receiving the groupcast signal, the wireless communication device may receive the groupcast signal from the second UE at a second time subsequent to the first time.

In other implementations, the first UE and the at least one other sidelink UE operate in a second mode of sidelink communication, as described in reference to FIG. 4. In this regard, the wireless communication device can receive a sidelink configuration from the second UE at a first time. In some aspects of receiving the groupcast signal, the wireless communication device may receive the groupcast signal from the second UE at a second time subsequent to the first time.

As illustrated at 1004, the wireless communication device may receive, from a second UE, a groupcast signal comprising a resource allocation assigned to a plurality of sidelink UEs including the first UE. The groupcast signal may be received, e.g., by the groupcast component 1342 of the apparatus 1302 through the reception component 1330 of the apparatus 1302 in FIG. 13. In some implementations, the resource allocation includes a first set of resources indicating first time and frequency resources for a first hop transmission path between the second UE and the first UE and a second set of resources indicating second time and frequency resources for a second hop transmission path between the first UE and the remote apparatus. In some aspects, the first resource includes a plurality of physical sidelink shared channels (PSSCHs), multiplexed in time or frequency. In some aspects of receiving the groupcast signal, the wireless communication device can receive the groupcast signal in a first PSSCH of the plurality of PSSCHs. In some aspects, the first PSSCH includes a second stage sidelink control information (SCI-2). In this regard, the wireless communication device may receive the resource allocation in a common portion of the SCI-2 when the synchronous relay mode is selected. Alternatively, the wireless communication device can receive the resource allocation in a UE-specific portion of the SCI-2. In other aspects, the wireless communication device may receive the resource allocation in the MAC-CE of the first PSSCH.

At 1006, the wireless communication device may determine whether the first UE operates in a synchronous relay mode or an asynchronous relay mode with the at least one other sidelink UE based on at least a portion of the groupcast signal. The synchronous relay mode or the asynchronous relay mode may be determined, e.g., by the relay mode component 1346 of the apparatus 1302 through coordination with the determination component 1348 of the apparatus 1302 in FIG. 13. At 1008, the wireless communication device performs the determination operation, where if the wireless communication device determines that the wireless communication device operates in the synchronous relay mode, then the process 1000 proceeds to block 1014. Otherwise, the wireless communication device determines that the wireless communication device operates in the asynchronous relay mode and the process 1000 proceeds to block 1010.

At 1010, the wireless communication device may transmit a unique relay identifier in the first relay signal that is different from a relay identifier included in the second relay signal based on an asynchronous relay mode between the first UE and the at least one other sidelink UE. The unique relay identifier in the first relay signal may be transmitted, e.g., by the relay identifier component 1350 of the apparatus 1302 through the transmission component 1334 of the apparatus 1302 in FIG. 13.

At 1012, the wireless communication device may transmit an indication of the second set of resources to the remote apparatus so that the remote apparatus combines the first relay signal with the second relay signal to recover data from the second UE. The indication may be indicated, e.g., by the resource component 1342 of the apparatus 1302 through the transmission component 1334 of the apparatus 1302 in FIG. 13.

In some implementations, the at least a portion of the groupcast signal includes a second stage sidelink control information (SCI-2). In some aspects of receiving the groupcast signal, the wireless communication device may receive a common virtual relay identifier in the SCI-2. In some aspects, the common virtual relay identifier is equivalent between the first UE and the at least one other sidelink UE. At 1014, the wireless communication device may determine that the first UE operates in the synchronous relay mode with the at least one other sidelink UE based on the common virtual relay identifier being received in the SCI-2. The synchronous relay mode may be determined, e.g., by the relay mode component 1346 of the apparatus 1302 through coordination with the determination component 1348 of the apparatus 1302 in FIG. 13.

At 1016, the wireless communication device may transmit a common virtual relay identifier in the first relay signal as a source identifier that is equivalent to a relay identifier included in the second relay signal based on the synchronous relay mode between the first UE and the at least one other sidelink UE. The common virtual relay identifier may be transmitted, e.g., by the relay identifier component 1350 of the apparatus 1302 through the transmission component 1334 of the apparatus 1302 in FIG. 13. In some aspects, the source identifier may indicate that the first UE is a data source.

At 1018, the wireless communication device may communicate, with a remote apparatus (e.g., UE 840, UE 904*c*) on a first resource included in the resource allocation, a first relay signal comprising at least a portion of the groupcast signal. In some aspects, the first relay signal corresponds to at least a portion of a second relay signal communicated with the remote apparatus on a second resource included in the resource allocation by at least one other sidelink UE of the plurality of sidelink UEs (e.g., UEs 822, 824, 826). The first relay signal may be communicated, e.g., by the relay mode component 1346 of the apparatus 1302 and/or the processor component 1352 of the apparatus 1302 through the transmission component 1334 of the apparatus 1302 in FIG. 13.

In some aspects of communicating the first relay signal, the wireless communication device may transmit the first relay signal concurrently with the at least a portion of the second relay signal to the remote apparatus. In one or more implementations, the wireless communication device can transmit the first relay signal as a unicast transmission to the remote apparatus. In some implementations, the first resource includes a same time and frequency resource as the second resource in the synchronous relay mode. In some implementations, the first resource includes a different time and frequency resource than the second resource in the asynchronous relay mode.

Figure 11:
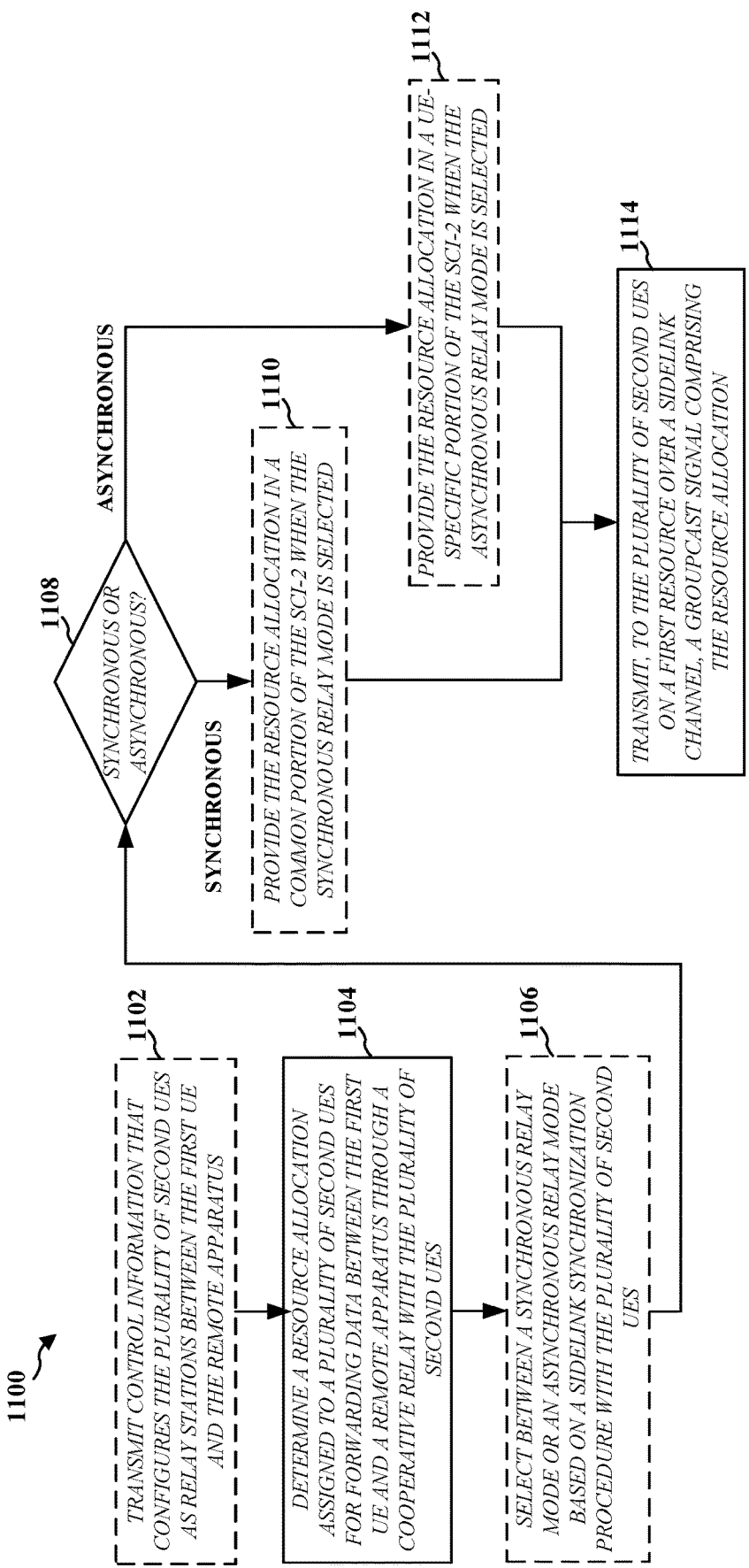
FIG. 11 is a flowchart of a process of wireless communication, in accordance with one or more of aspects of the present disclosure.

FIG. 11 is a flowchart of a process 1100 of wireless communication. The process 1100 may be performed by a wireless communication device (e.g., the UE 104, 402, 404, 406, 408; the device 350, the RSU 107, 407, UE 810, UE 904b; the apparatus 1302, which may include memory, a cellular baseband processor 1304, and one or more components configured to perform the process 1100). As illustrated, the process 1100 includes a number of enumerated steps, but embodiments of the process 1100 may include additional steps before, after, and in between the enumerated steps. In some embodiments, one or more of the enumerated steps may be omitted or performed in a different order. Optional aspects are illustrated with a dashed line. The process 1100 enables a wireless communication device to facilitate cooperative relaying in sidelink networks by providing sidelink control information to other sidelink transmitting UE(s) serving as relay stations to forward source UE data to a destination through a synchronous relay mode or asynchronous relay mode. The cooperative relaying through sidelink transmitting UE(s) provides diversity gain and power gain with increased reliability and coverage of the relay link between the sidelink transmitting UE(s) and the destination. Thus, the mechanism may increase uplink coverage to a base station serving as the destination or increase sidelink coverage to a sidelink receiving UE serving as the destination.

At 1102, the wireless communication device transmits control information that configures a plurality of second UEs as relay stations between the wireless communication device and a remote apparatus. The control information may be transmitted, e.g., by the configuration component 1340 of the apparatus 1302 through the transmission component 1334 of the apparatus 1302 in FIG. 13.

At 1104, the wireless communication device determines a resource allocation assigned to a plurality of second UEs for forwarding data between the first UE and a remote apparatus through a cooperative relay with the plurality of second UEs. The resource allocation may be determined, e.g., by the resource component 1342 of the apparatus 1302 through coordination with the determination component 1348 of the apparatus 1302 in FIG. 13. In some aspects, the resource allocation includes a first set of resources indicating first time and frequency resources for a first hop transmission path between the first UE and the plurality of second UEs and a second set of resources indicating second time and frequency resources for a second hop transmission path between the plurality of second UEs and the remote apparatus.

At 1106, the wireless communication device may select between a synchronous relay mode or an asynchronous relay mode based on a sidelink synchronization procedure with the plurality of second UEs. The synchronous relay mode or the asynchronous relay mode may be selected, e.g., by the relay mode component 1346 through coordination with the determination component 1348 of the apparatus 1302 in FIG. 13. At 1108, the wireless communication device performs the selection operation, where if the wireless communication device selects the synchronous relay mode, then the process 1100 proceeds to block 1110. Otherwise, the wireless communication device selects the asynchronous relay mode and the process 1100 proceeds to block 1112.

At 1110, the wireless communication device may provide the resource allocation in a common portion of a sidelink control information portion of the groupcast signal when the synchronous relay mode is selected. The resource allocation in the common portion of the sidelink control information portion may be provided, e.g., by the configuration component 1340 of the apparatus 1302 through coordination with the resource component 1342 of the apparatus 1302 in FIG. 13.

Alternatively, at 1112, the wireless communication device can provide the resource allocation in a UE-specific portion of the sidelink control information portion of the groupcast signal when the asynchronous relay mode is selected. The resource allocation in the UE-specific portion of the sidelink control information portion may be provided, e.g., by the configuration component 1340 of the apparatus 1302 through coordination with the resource component 1342 of the apparatus 1302 in FIG. 13.

At 1114, the wireless communication device may transmit, to the plurality of second UEs on a first resource over a sidelink channel, a groupcast signal comprising the resource allocation. The groupcast signal may be transmitted, e.g., by the groupcast component 1344 of the apparatus 1302 through the transmission component 1334 of the apparatus 1302 in FIG. 13. In some aspects, the plurality of second UEs operate in a second mode of sidelink communication. In some aspects of transmitting the control information, the wireless communication device can transmit a sidelink configuration to the plurality of second UEs at a first time. In some aspects of transmitting the groupcast signal, the wireless communication device can transmit the groupcast signal to the plurality of second UEs at a second time subsequent to the first time.

In some aspects, the first resource includes a plurality of physical sidelink shared channels (PSSCHs), multiplexed in time or frequency. In some aspects of transmitting the groupcast signal, the wireless communication device can transmit the groupcast signal in a first PSSCH of the plurality of PSSCHs. In some aspects, the first PSSCH includes a second stage sidelink control information (SCI-2). In this regard, the wireless communication device may provide the resource allocation in a common portion of the SCI-2 when the synchronous relay mode is selected. Alternatively, the wireless communication device can provide the resource allocation in a UE-specific portion of the SCI-2. In other aspects, the wireless communication device may provide the resource allocation in the MAC-CE of the first PSSCH.

FIG. 12 is a flowchart of a process 1200 of wireless communication. The process 1200 may be performed by a wireless communication device (e.g., the UE 104, 402, 404, 406, 408; the BS 102 or 180, the device 310 or 350, the RSU 107, 407, the device 840, the device 904c; the apparatus 1302, which may include memory, a cellular baseband processor 1304, and one or more components configured to perform the process 1200). As illustrated, the process 1200 includes a number of enumerated steps, but embodiments of the process 1200 may include additional steps before, after, and in between the enumerated steps. In some embodiments, one or more of the enumerated steps may be omitted or performed in a different order. Optional aspects are illustrated with a dashed line. The process 1200 enables a wireless communication device to facilitate cooperative relaying in sidelink networks by providing sidelink control information to other sidelink transmitting UE(s) serving as relay stations to forward source UE data to a destination through a synchronous relay mode or asynchronous relay mode. The cooperative relaying through sidelink transmitting UE(s) provides diversity gain and power gain with increased reliability and coverage of the relay link between the sidelink transmitting UE(s) and the destination. Thus, the mechanism may increase uplink coverage to a base station serving as the destination or increase sidelink coverage to a sidelink receiving UE serving as the destination.

As illustrated at 1202, the wireless communication device may receive an indication of a set of resources indicating time and frequency resources for a hop transmission path between the plurality of first UEs and the apparatus. The indication of the set of resources may be received, e.g., by the reception component 1330 of the apparatus 1302 in FIG. 13.

At 1204, the wireless communication device may receive, from a plurality of first UEs, a plurality of relay signals that are cooperatively relayed through respective ones of the plurality of first UEs. The plurality of relay signals may be received, e.g., by the reception component 1330 of the apparatus 1302 in FIG. 13.

In some aspects of receiving the plurality of relay signals, the wireless communication device may receive the first relay signal and the second relay signal based on the set of resources. In some aspects of receiving the plurality of relay signals, the wireless communication device may receive a first relay signal associated with a first relay UE of the plurality of first UEs concurrently with at least a portion of a second relay signal associated with a second relay UE of the plurality of first UEs. In some aspects of receiving the first relay signal, the wireless communication device may receive a common virtual relay identifier in the first relay signal that is equivalent to a relay identifier included in the second relay signal based on a synchronous relay mode between the plurality of first UEs. In some aspects of receiving the plurality of relay signals, the wireless communication device may receive the first relay signal in a same time and frequency resource as the second relay signal in the synchronous relay mode. In other aspects of receiving the plurality of relay signals, the wireless communication device may receive a unique relay identifier in the first relay signal that is different from a relay identifier included in the second relay signal based on an asynchronous relay mode between the plurality of first UEs. In some aspects of receiving the plurality of relay signals, the wireless communication device may receive the first relay signal in a different time and frequency resource than the second relay signal in the asynchronous relay mode. In some aspects of receiving the plurality of relay signals, the wireless communication device can receive the plurality of relay signals as respective unicast transmissions from the plurality of first UEs.

At 1206, the wireless communication device may decode each of the plurality of relay signals to recover a respective portion of a groupcast signal originating from a second UE. The plurality of relay signals may be decoded, e.g., by the processor component 1352 of the apparatus 1302 in FIG. 13. In some aspects, the decoding includes combining the first relay signal with the second relay signal to recover data from the second UE.

Figure 13:
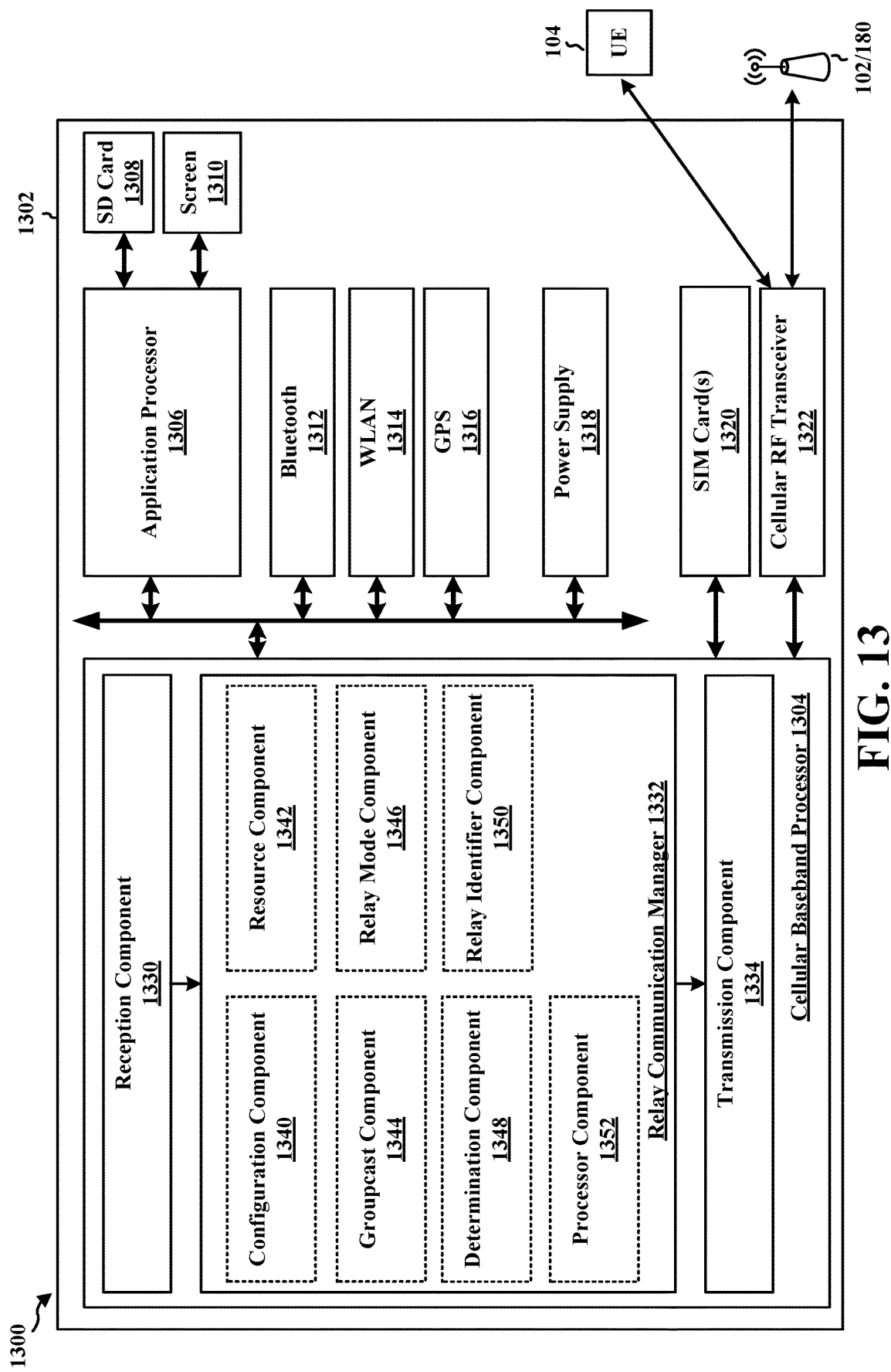
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE or other wireless device that communicates based on sidelink. The apparatus 1302 includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with other wireless devices, such as a UE 104 and/or base station 102/180. The cellular baseband processor 1304 may include a computer-readable medium/memory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a relay communication manager 1332, and a transmission component 1334. The relay communication manager 1332 includes the one or more illustrated components. The components within the relay communication manager 1332 may be stored in the computer-readable medium/memory and/or configured as hardware within the cellular baseband processor 1304. The cellular baseband processor 1304 may be a component of the device 310 or 350 and may include the memory 360 or 370 and/or at least one of the TX processor 316 or 368, the RX processor 356 or 370, and the controller/processor 359 or 375. In one configuration, the apparatus 1302 may be a modem chip and include just the baseband processor 1304, and in another configuration, the apparatus 1302 may be the entire wireless device (e.g., see the device 310 or 350 of FIG. 3) and include the additional modules of the apparatus 1302.

The relay communication manager 1332 includes a configuration component 1340, a resource component 1342, a groupcast component 1344, a relay mode component 1346, a determination component 1348, a relay identifier component 1350 and/or a processor component 1352 configured to perform the aspects described in connection with methods in FIG. 10, FIG. 11 and/or FIG. 12. The apparatus is illustrated as including components to perform the method of FIG. 10, FIG. 11 and/or FIG. 12, because the wireless device may operate as a transmitting device at times and may operate as a receiving device at other times. In other examples, the apparatus 1302 may include components for the method of FIG. 10 without including components configured to perform the method of FIG. 11 and/or FIG. 12, or may include components for the method of FIG. 11 without including components configured to perform the method of FIG. 10 and/or FIG. 12, or may include components for the method of FIG. 12 without including components configured to perform the method of FIG. 10 and/or FIG. 11.

The apparatus 1302 may include additional components that perform each of the blocks of the algorithm in the aforementioned flowcharts of FIG. 10, FIGS. 11 and/or 12. As such, each block in the aforementioned flowcharts of FIG. 10, FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving, at a first UE from a second UE, a groupcast signal comprising a resource allocation assigned to a plurality of sidelink UEs including the first UE. The apparatus 1302 may further include means for communicating, with a remote apparatus on a first resource included in the resource allocation, a first relay signal comprising at least a portion of the groupcast signal, the first relay signal corresponding to at least a portion of a second relay signal communicated with the remote apparatus on a second resource included in the resource allocation by at least one other sidelink UE of the plurality of sidelink UEs.

The apparatus 1302 may further include means for determining a resource allocation assigned to a plurality of second UEs for forwarding data between the first UE and a remote apparatus through a cooperative relay with the plurality of second UEs. The apparatus 1302 may further include means for transmitting, to the plurality of second UEs on a first resource over a sidelink channel, a groupcast signal comprising the resource allocation.

The apparatus 1302 may further include means for receiving, from a plurality of first UEs, a plurality of relay signals that are cooperatively relayed through respective ones of the plurality of first UEs. The apparatus 1302 may further include means for decoding each of the plurality of relay signals to recover a respective portion of a groupcast signal originating from a second UE.

The aforementioned means may be one or more of the aforementioned components of the apparatus 1302 configured to perform the functions recited by the aforementioned means. As described supra, the apparatus 1302 may include the TX Processor 316 or 368, the RX Processor 356 or 370, and the controller/processor 359 or 375. As such, in one configuration, the aforementioned means may be the TX Processor 316 or 368, the RX Processor 356 or 370, and the controller/processor 359 or 375 configured to perform the functions recited by the aforementioned means.

The following examples are illustrative only and may be combined with aspects of other embodiments or teachings described herein, without limitation.

Example 1 is a method of wireless communication performed by a first user equipment (UE), comprising: receiving, from a second UE, a groupcast signal comprising a resource allocation assigned to a plurality of sidelink UEs including the first UE; and communicating, with a remote apparatus on a first resource included in the resource allocation, a first relay signal comprising at least a portion of the groupcast signal, the first relay signal corresponding to at least a portion of a second relay signal communicated with the remote apparatus on a second resource included in the resource allocation by at least one other sidelink UE of the plurality of sidelink UEs.

In Example 2, the method of Example 1 further includes that the communicating the first relay signal comprises transmitting the first relay signal concurrently with the at least a portion of the second relay signal to the remote apparatus.

In Example 3, the method of any of Example 1 or Example 2 further includes that the transmitting the first relay signal comprises providing a common virtual relay identifier in the first relay signal that is equivalent to a relay identifier included in the second relay signal based on a synchronous relay mode between the first UE and the at least one other sidelink UE.

In Example 4, the method of any of Examples 1 to 3 further includes that the first resource comprises a same time and frequency resource as the second resource in the synchronous relay mode.

In Example 5, the method of any of Examples 1 to 4 further includes that the transmitting the first relay signal comprises providing a unique relay identifier in the first relay signal that is different from a relay identifier included in the second relay signal based on an asynchronous relay mode between the first UE and the at least one other sidelink UE.

In Example 6, the method of any of Examples 1 to 5 further includes that the first resource comprises a different time and frequency resource than the second resource in the asynchronous relay mode.

In Example 7, the method of any of Examples 1 to 6 further includes receiving control information that configures the first UE and the at least one other sidelink UE as relay stations between the second UE and the remote apparatus.

In Example 8, the method of any of Examples 1 to 7 further includes that the first UE and the at least one other sidelink UE operate in a first mode of sidelink communication, the receiving the control information comprises receiving a downlink configuration from a base station at a first time, and the receiving the groupcast signal comprises receiving the groupcast signal from the second UE at a second time subsequent to the first time.

In Example 9, the method of any of Examples 1 to 7 further includes that the first UE and the at least one other sidelink UE operate in a second mode of sidelink communication, the receiving the control information comprises receiving a sidelink configuration from the second UE at a first time, and the receiving the groupcast signal comprises receiving the groupcast signal from the second UE at a second time subsequent to the first time.

In Example 10, the method of any of Examples 1 to 9 further includes that determining whether the first UE operates in a synchronous relay mode or an asynchronous relay mode with the at least one other sidelink UE based on at least a portion of the groupcast signal.

In Example 11, the method of any of Examples 1 to 10 further includes that the at least a portion of the groupcast signal comprises a second stage sidelink control information (SCI-2), the receiving the groupcast signal comprises receiving a common virtual relay identifier in the SCI-2, and the common virtual relay identifier is equivalent between the first UE and the at least one other sidelink UE, further comprising: determining that the first UE operates in the synchronous relay mode with the at least one other sidelink UE based on the common virtual relay identifier being received in the SCI-2.

In Example 12, the method of Example 11 further includes that the communicating the first relay signal comprises transmitting the first relay signal with the common virtual relay identifier as a source identifier to the remote apparatus, the source identifier indicating that the first UE is a data source.

In Example 13, the method of any of Examples 1 to 10 further includes that the communicating the first relay signal comprises transmitting the first relay signal with a unique relay identifier as a source identifier associated with the first UE when the first UE is determined to operate in the asynchronous relay mode with the at least one other sidelink UE, the source identifier indicating that the first UE is a data source.

In Example 14, the method of Example 13 further includes that the resource allocation comprises a first set of resources indicating first time and frequency resources for a first hop transmission path between the second UE and the first UE and a second set of resources indicating second time and frequency resources for a second hop transmission path between the first UE and the remote apparatus, and the communicating the first relay signal comprises transmitting an indication of the second set of resources to the remote apparatus so that the remote apparatus combines the first relay signal with the second relay signal to recover data from the second UE.

In Example 15, the method of any of Examples 1 to 10 further includes that the first resource comprises a plurality of physical sidelink shared channels (PSSCHs), multiplexed in time or frequency, the receiving the groupcast signal comprises receiving the groupcast signal in a first PSSCH of the plurality of PSSCHs, and the first PSSCH comprises a second stage sidelink control information (SCI-2).

In Example 16, the method of Example 15 further includes that the receiving the groupcast signal comprises receiving the resource allocation in a common portion of the SCI-2 when the first UE is determined to operate in the synchronous relay mode.

In Example 17, the method of any of Examples 1 to 16 includes that the receiving the groupcast signal comprises receiving the resource allocation in a UE-specific portion of the SCI-2 when the first UE is determined to operate in the asynchronous relay mode.

In Example 18, the method of any of Examples 1 to 17 includes that the communicating the first relay signal comprises transmitting the first relay signal as a unicast transmission to the remote apparatus.

In Example 19, the method of any of Examples 1 to 18 includes that the remote apparatus is a UE.

In Example 20, the method of any of Examples 1 to 19 includes that the remote apparatus is a base station.

Example 21 is a device including one or more processors and one or more memories in electronic communication with the one or more processors storing instructions executable by the one or more processors to cause a system or an apparatus to implement a method as in any of Examples 1 to 20.

Example 22 is a system or apparatus including means for implementing a method or realizing an apparatus as in any of Examples 1 to 20.

Example 23 is a non-transitory computer-readable medium storing instructions executable by one or more processors to cause the one or more processors to implement a method as in any of Examples 1 to 20.

Example 24 is a method of wireless communication at a first UE, comprising: determining a resource allocation assigned to a plurality of second UEs for forwarding data between the first UE and a remote apparatus through a cooperative relay with the plurality of second UEs; and transmitting, to the plurality of second UEs on a first resource over a sidelink channel, a groupcast signal comprising the resource allocation.

In Example 25, the method of Example 24 further includes selecting between a synchronous relay mode or an asynchronous relay mode based on a sidelink synchronization procedure with the plurality of second UEs.

In Example 26, the method of any of Example 24 or Example 25 further includes that the first resource comprises a plurality of physical sidelink shared channels (PSSCHs), multiplexed in time or frequency, and the transmitting the groupcast signal comprises transmitting the groupcast signal in a first PSSCH of the plurality of PSSCHs, the first PSSCH comprises a second stage sidelink control information (SCI-2).

In Example 27, the method of any of Examples 24 to 26 further includes that the transmitting the groupcast signal comprises transmitting the resource allocation in a common portion of the SCI-2 when the synchronous relay mode is selected.

In Example 28, the method of any of Examples 24 to 26 further includes that the transmitting the groupcast signal comprises transmitting the resource allocation in a UE-specific portion of the SCI-2 when the asynchronous relay mode is selected.

In Example 29, the method of any of Examples 24 to 28 further includes that the resource allocation comprises a first set of resources indicating first time and frequency resources for a first hop transmission path between the first UE and the plurality of second UEs and a second set of resources indicating second time and frequency resources for a second hop transmission path between the plurality of second UEs and the remote apparatus.

In Example 30, the method of any of Examples 24 to 29 further includes transmitting control information that configures the plurality of second UEs as relay stations between the first UE and the remote apparatus.

In Example 31, the method of any of Examples 24 to 30 further includes that the plurality of second UEs operate in a second mode of sidelink communication, the transmitting the control information comprises transmitting a sidelink configuration to the plurality of second UEs at a first time, and the transmitting the groupcast signal comprises transmitting the groupcast signal to the plurality of second UEs at a second time subsequent to the first time.

Example 32 is a device including one or more processors and one or more memories in electronic communication with the one or more processors storing instructions executable by the one or more processors to cause a system or an apparatus to implement a method as in any of Examples 24 to 31.

Example 33 is a system or apparatus including means for implementing a method or realizing an apparatus as in any of Examples 24 to 31.

Example 34 is a non-transitory computer-readable medium storing instructions executable by one or more processors to cause the one or more processors to implement a method as in any of Examples 24 to 31.

Example 35 is a method of wireless communication at an apparatus, comprising: receiving, from a plurality of first user equipments (UEs), a plurality of relay signals that are cooperatively relayed through respective ones of the plurality of first UEs; and decoding each of the plurality of relay signals to recover a respective portion of a groupcast signal originating from a second UE.

In Example 36, the method of Example 35 further includes that the receiving the plurality of relay signals comprises receiving a first relay signal associated with a first relay UE of the plurality of first UEs concurrently with at least a portion of a second relay signal associated with a second relay UE of the plurality of first UEs.

In Example 37, the method of any of Example 35 or Example 36 further includes that the receiving the first relay signal comprises receiving a common virtual relay identifier in the first relay signal that is equivalent to a relay identifier included in the second relay signal based on a synchronous relay mode between the plurality of first UEs.

In Example 38, the method of any of Examples 35 to 37 further includes that the receiving the plurality of relay signals comprises receiving the first relay signal in a same time and frequency resource as the second relay signal in the synchronous relay mode.

In Example 39, the method of any of Examples 35 to 38 further includes that the receiving the plurality of relay signals comprises receiving a unique relay identifier in the first relay signal that is different from a relay identifier included in the second relay signal based on an asynchronous relay mode between the plurality of first UEs.

In Example 40, the method of any of Examples 35 to 39 further includes that the receiving the plurality of relay signals comprises receiving the first relay signal in a different time and frequency resource than the second relay signal in the asynchronous relay mode.

In Example 41, the method of any of Examples 35 to 40 further includes receiving an indication of a set of resources indicating time and frequency resources for a hop transmission path between the plurality of first UEs and the first UE, wherein: the receiving the plurality of relay signals comprises receiving the first relay signal and the second relay signal based on the set of resources, and the decoding comprises combining the first relay signal with the second relay signal to recover data from the second UE.

In Example 42, the method of any of Examples 35 to 41 further includes that the receiving the plurality of relay signals comprises receiving the plurality of relay signals as respective unicast transmissions from the plurality of first UEs.

In Example 43, the method of any of Examples 35 to 43 further includes that the apparatus is a UE.

In Example 44, the method of any of Examples 35 to 44 further includes that the apparatus is a base station.

Example 45 is a device including one or more processors and one or more memories in electronic communication with the one or more processors storing instructions executable by the one or more processors to cause a system or an apparatus to implement a method as in any of Examples 35 to 44.

Example 46 is a system or apparatus including means for implementing a method or realizing an apparatus as in any of Examples 35 to 44.

Example 47 is a non-transitory computer-readable medium storing instructions executable by one or more processors to cause the one or more processors to implement a method as in any of Examples 35 to 44.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE), the apparatus comprising:
   at least one processor;
   a transceiver; and
   a memory, coupled to the at least one processor and the transceiver, storing instructions, which when executed by the at least one processor, cause the apparatus to:
   receive, from a second UE, via the transceiver, a groupcast signal comprising a resource allocation originating from the second UE that is assigned to a plurality of sidelink UEs including the first UE; and
   communicate, with a remote apparatus on a first resource included in the resource allocation, via the transceiver, a first relay signal comprising at least a portion of the groupcast signal, the first relay signal corresponding to at least a portion of a second relay signal communicated with the remote apparatus on a second resource included in the resource allocation by at least one other sidelink UE of the plurality of sidelink UEs.

2. The apparatus of claim 1, wherein the communicating the first relay signal comprises to transmit, via the transceiver, the first relay signal concurrently with the at least a portion of the second relay signal to the remote apparatus.

3. The apparatus of claim 2, wherein the transmitting the first relay signal comprises to provide a common virtual relay identifier in the first relay signal that is equivalent to a relay identifier included in the second relay signal based on a synchronous relay mode between the first UE and the at least one other sidelink UE, wherein the first resource comprises a same time and frequency resource as the second resource in the synchronous relay mode.

4. The apparatus of claim 2, wherein the transmitting the first relay signal comprises to provide a unique relay identifier in the first relay signal that is different from a relay identifier included in the second relay signal based on an asynchronous relay mode between the first UE and the at least one other sidelink UE, wherein the first resource comprises a different time and frequency resource than the second resource in the asynchronous relay mode.

5. The apparatus of claim 1, wherein the instructions, which when executed by the at least one processor, further cause the apparatus to:
   receive, via the transceiver, control information that configures the first UE and the at least one other sidelink UE as relay stations between the second UE and the remote apparatus.

6. The apparatus of claim 5, wherein:
the first UE and the at least one other sidelink UE operate in a first mode of sidelink communication,
the receiving the control information comprises to receive, via the transceiver, a downlink configuration from a base station at a first time, and
the receiving the groupcast signal comprises to receive, via the transceiver, the groupcast signal from the second UE at a second time subsequent to the first time.

7. The apparatus of claim 5, wherein:
the first UE and the at least one other sidelink UE operate in a second mode of sidelink communication,
the receiving the control information comprises to receive, via the transceiver, a sidelink configuration from the second UE at a first time,
the receiving the groupcast signal comprises to receive, via the transceiver, the groupcast signal from the second UE at a second time subsequent to the first time, and
the instructions, which when executed by the at least one processor, further cause the apparatus to:
determine whether the first UE operates in a synchronous relay mode or an asynchronous relay mode with the at least one other sidelink UE based on at least a portion of the groupcast signal.

8. The apparatus of claim 7, wherein:
the at least a portion of the groupcast signal comprises a second stage sidelink control information (SCI-2),
the receiving the groupcast signal comprises to receive, via the transceiver, a common virtual relay identifier in the SCI-2,
the common virtual relay identifier is equivalent between the first UE and the at least one other sidelink UE,
the instructions, which when executed by the at least one processor, further cause the apparatus to:
determine that the first UE operates in the synchronous relay mode with the at least one other sidelink UE based on the common virtual relay identifier being received in the SCI-2, and
the communicating the first relay signal comprises to transmit, via the transceiver, the first relay signal with the common virtual relay identifier as a source identifier to the remote apparatus, the source identifier indicating that the first UE is a data source.

9. The apparatus of claim 7, wherein:
the communicating the first relay signal comprises to transmit, via the transceiver, the first relay signal with a unique relay identifier as a source identifier associated with the first UE when the first UE is determined to operate in the asynchronous relay mode with the at least one other sidelink UE, the source identifier indicating that the first UE is a data source,
the resource allocation comprises a first set of resources indicating first time and frequency resources for a first hop transmission path between the second UE and the first UE and a second set of resources indicating second time and frequency resources for a second hop transmission path between the first UE and the remote apparatus, and
the communicating the first relay signal comprises to transmit, via the transceiver, an indication of the second set of resources to the remote apparatus so that the remote apparatus combines the first relay signal with the second relay signal to recover data from the second UE.

10. The apparatus of claim 7, wherein:
the first resource comprises a plurality of physical sidelink shared channels (PSSCHs), multiplexed in time or frequency,
the receiving the groupcast signal comprises to receive, via transceiver, the groupcast signal in a first PSSCH of the plurality of PSSCHs, and
the first PSSCH comprises a second stage sidelink control information (SCI-2).

11. The apparatus of claim 10, wherein the receiving the groupcast signal comprises to receive, via the transceiver, the resource allocation in a common portion of the SCI-2 when the first UE is determined to operate in the synchronous relay mode.

12. The apparatus of claim 10, wherein the receiving the groupcast signal comprises to receive, via the transceiver, the resource allocation in a UE-specific portion of the SCI-2 when the first UE is determined to operate in the asynchronous relay mode.

13. The apparatus of claim 1, wherein the communicating the first relay signal comprises to transmit, via the transceiver, the first relay signal as a unicast transmission to the remote apparatus.

14. The apparatus of claim 1, wherein the remote apparatus is a UE.

15. The apparatus of claim 1, wherein the remote apparatus is a base station.

16. A method of wireless communication performed by a first user equipment (UE), the method comprising:
receiving, from a second UE, a groupcast signal comprising a resource allocation originating from the second UE that is assigned to a plurality of sidelink UEs including the first UE; and
communicating, with a remote apparatus on a first resource included in the resource allocation, a first relay signal comprising at least a portion of the groupcast signal, the first relay signal corresponding to at least a portion of a second relay signal communicated with the remote apparatus on a second resource included in the resource allocation by at least one other sidelink UE of the plurality of sidelink UEs.

17. An apparatus for wireless communication at a first user equipment (UE), the apparatus comprising:
means for determining a resource allocation originating from the first UE that is assigned to a plurality of second UEs for forwarding data between the first UE and a remote apparatus through a cooperative relay with the plurality of second UEs; and
means for transmitting, to the plurality of second UEs on a first resource over a sidelink channel, a groupcast signal comprising the resource allocation.

18. The apparatus of claim 17, further comprising:
means for selecting between a synchronous relay mode or an asynchronous relay mode based on a sidelink synchronization procedure with the plurality of second UEs,
wherein:
the first resource comprises a plurality of physical sidelink shared channels (PSSCHs), multiplexed in time or frequency,
the means for transmitting the groupcast signal is configured to transmit the groupcast signal in a first PSSCH of the plurality of PSSCHs, and
the first PSSCH comprises a second stage sidelink control information (SCI-2).

19. The apparatus of claim 18, wherein the means for transmitting the groupcast signal is configured to transmit the resource allocation in a common portion of the SCI-2 when the synchronous relay mode is selected.

20. The apparatus of claim 18, wherein the means for transmitting the groupcast signal is configured to transmit the resource allocation in a UE-specific portion of the SCI-2 when the asynchronous relay mode is selected.

21. The apparatus of claim 17, wherein the resource allocation comprises a first set of resources indicating first time and frequency resources for a first hop transmission path between the first UE and the plurality of second UEs and a second set of resources indicating second time and frequency resources for a second hop transmission path between the plurality of second UEs and the remote apparatus.

22. The apparatus of claim 17, further comprising:
means for transmitting control information that configures the plurality of second UEs as relay stations between the first UE and the remote apparatus,
wherein:
the plurality of second UEs operate in a second mode of sidelink communication,
the means for transmitting the control information is configured to transmit a sidelink configuration to the plurality of second UEs at a first time, and
the means for transmitting the groupcast signal is configured to transmit the groupcast signal to the plurality of second UEs at a second time subsequent to the first time.

23. A method of wireless communication performed by an apparatus, the method comprising:
receiving, from a plurality of first user equipment (UEs), a plurality of relay signals that are cooperatively relayed through respective ones of the plurality of first UEs on resources of a resource allocation originating from a second UE; and
decoding each of the plurality of relay signals to recover a respective portion of a groupcast signal originating from the second UE.

24. The method of claim 23, wherein the receiving the plurality of relay signals comprises receiving a first relay signal associated with a first relay UE of the plurality of first UEs concurrently with at least a portion of a second relay signal associated with a second relay UE of the plurality of first UEs.

25. The method of claim 24, wherein:
the receiving the first relay signal comprises receiving a common virtual relay identifier in the first relay signal that is equivalent to a relay identifier included in the second relay signal based on a synchronous relay mode between the plurality of first UEs, and
the receiving the plurality of relay signals comprises receiving the first relay signal in a same time and frequency resource as the second relay signal in the synchronous relay mode.

26. The method of claim 24, wherein:
the receiving the plurality of relay signals comprises receiving a unique relay identifier in the first relay signal that is different from a relay identifier included in the second relay signal based on an asynchronous relay mode between the plurality of first UEs, and
the receiving the plurality of relay signals comprises receiving the first relay signal in a different time and frequency resource than the second relay signal in the asynchronous relay mode.

27. The method of claim 24, further comprising receiving an indication of a set of resources indicating time and frequency resources for a hop transmission path between the plurality of first UEs and the apparatus,
wherein:
the receiving the plurality of relay signals comprises receiving the first relay signal and the second relay signal based on the set of resources, and
the decoding comprises combining the first relay signal with the second relay signal to recover data from the second UE.

28. The method of claim 23, wherein the receiving the plurality of relay signals comprises receiving the plurality of relay signals as respective unicast transmissions from the plurality of first UEs.

29. The method of claim 23, wherein the apparatus is a UE.

30. The method of claim 23, wherein the apparatus is a base station.

* * * * *